US011763829B2

(12) United States Patent
Xiao

(10) Patent No.: US 11,763,829 B2
(45) Date of Patent: Sep. 19, 2023

(54) BANDWIDTH EXTENSION METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Wei Xiao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 23 days.

(21) Appl. No.: 17/468,662

(22) Filed: Sep. 7, 2021

(65) Prior Publication Data

US 2021/0407526 A1    Dec. 30, 2021

Related U.S. Application Data

(63) Continuation of application No. PCT/CN2020/115052, filed on Sep. 14, 2020.

(30) Foreign Application Priority Data

Sep. 18, 2019  (CN) .......................... 201910882478.4

(51) Int. Cl.
*G10L 19/02*  (2013.01)
*G10L 25/30*  (2013.01)
(Continued)

(52) U.S. Cl.
CPC ...... *G10L 19/0212* (2013.01); *G10L 19/0204* (2013.01); *G10L 19/0208* (2013.01);
(Continued)

(58) Field of Classification Search
CPC ............... G10L 21/038; G10L 21/0388; G10L 19/0204; G10L 19/0208; G10L 19/02; G10L 19/00
See application file for complete search history.

(56) References Cited

U.S. PATENT DOCUMENTS 6,144,937 A * 11/2000 Ali ...................... G10L 21/0208
704/226
7,698,143 B2   4/2010 Ramakrishnan et al.
(Continued)

FOREIGN PATENT DOCUMENTS

CN    101288614 A   10/2008
CN    101471072 A    7/2009
(Continued)

OTHER PUBLICATIONS

Schmidt et al., "Blind bandwidth extension based on convolutional and recurrent deep neural networks.") 2018 IEEE International Conference on Acoustics, Speech and Signal Processing (ICASSP). IEEE (Year: 2018).*
(Continued)

*Primary Examiner* — Samuel G Neway
(74) *Attorney, Agent, or Firm* — ANOVA LAW GROUP PLLC

(57) ABSTRACT

Embodiments of this application disclose a bandwidth extension (BWE) method and apparatus. The method is performed by an electronic device, and includes: performing a time-frequency transform on a to-be-processed narrowband signal to obtain a corresponding initial low-frequency spectrum; obtaining a correlation parameter of a high-frequency portion and a low-frequency portion of a target broadband spectrum based on the initial low-frequency spectrum by using a neural network model; obtaining an initial high-frequency spectrum based on the correlation parameter and the initial low-frequency spectrum; and
(Continued)

obtaining a broadband signal according to a target low-frequency spectrum and a target high-frequency spectrum.

18 Claims, 4 Drawing Sheets

(51) Int. Cl.
  *G10L 21/0388* (2013.01)
  *G06N 3/02* (2006.01)
  *G10L 19/032* (2013.01)

(52) U.S. Cl.
  CPC .......... *G10L 21/0388* (2013.01); *G10L 25/30* (2013.01); *G06N 3/02* (2013.01); *G10L 19/032* (2013.01)

(56) References Cited

U.S. PATENT DOCUMENTS

| | | | | |
|---|---|---|---|---|
| 8,639,500 | B2* | 1/2014 | Choo | G10L 21/038 704/219 |
| 2004/0078200 | A1* | 4/2004 | Alves | G10L 21/0208 704/226 |
| 2007/0150269 | A1* | 6/2007 | Nongpiur | G10L 21/0364 704/226 |
| 2010/0280833 | A1* | 11/2010 | Yamanashi | G10L 21/038 704/500 |
| 2011/0137659 | A1* | 6/2011 | Honma | G10L 21/038 704/500 |
| 2012/0016667 | A1* | 1/2012 | Gao | G10L 19/002 704/203 |
| 2013/0144614 | A1 | 6/2013 | Myllyla et al. | |
| 2014/0257827 | A1* | 9/2014 | Norvell | G10L 21/038 704/500 |
| 2016/0133273 | A1* | 5/2016 | Kaniewska | G10L 21/038 704/205 |
| 2018/0040336 | A1* | 2/2018 | Wu | G10L 19/26 |
| 2021/0407526 | A1* | 12/2021 | Xiao | G10L 19/0204 |
| 2022/0068285 | A1* | 3/2022 | Xiao | G10L 19/0204 |

FOREIGN PATENT DOCUMENTS

| | | | | |
|---|---|---|---|---|
| CN | 101996640 | A | | 3/2011 |
| CN | 102044250 | A | | 5/2011 |
| CN | 103413557 | A | | 11/2013 |
| CN | 107993672 | A * | 5/2018 | .......... G10L 21/038 |
| CN | 110556122 | A | | 12/2019 |
| WO | 2019081070 | A1 | | 5/2019 |

OTHER PUBLICATIONS

Liu et al., "Audio bandwidth extension using ensemble of recurrent neural networks." EURASIP Journal on Audio, Speech, and Music Processing (Year: 2016).*
Li et al., "Speech bandwidth extension using generative adversarial networks." 2018 IEEE International Conference on Acoustics, Speech and Signal Processing (ICASSP). IEEE (Year: 2018).*
The European Patent Office (EPO) The Extended European Search Report for 20864964.0 dated May 9, 2022 6 Pages.
The World Intellectual Property Organization (WIPO) International Search Report for PCT/CN2020/115052 dated Oct. 29, 2020 6 Pages (including translation).
A. C. Den Brinker et al., "An Overview of the Coding Standard MPEG-4 Audio Amendments 1 and 2: HE-AAC, SSC, and HE-AAC v2," In EURASIP Journal on Audio, Speech, and Music Processing, 2009. 21 pages.
J. Abel et al., "Enhancing The EVS Codec in Wideband Mode by Blind Artificial Bandwidth Extension to Superwideband," In iWAENC, Sep. 2018. 5 pages.

* cited by examiner

BANDWIDTH EXTENSION METHOD AND APPARATUS, ELECTRONIC DEVICE, AND COMPUTER-READABLE STORAGE MEDIUM

RELATED APPLICATIONS

This application is a continuation application of PCT Application No. PCT/CN2020/115052, filed on Sep. 14, 2020, which in turn claims priority to Chinese Patent Application No. 201910882478.4, entitled "BANDWIDTH EXTENSION METHOD AND APPARATUS, ELECTRONIC DEVICE, AND COMPUTER-READABLE STORAGE MEDIUM" filed with the China National Intellectual Property Administration on Sep. 18, 2019. The two applications are incorporated herein by reference in their entirety.

FIELD OF THE TECHNOLOGY

Embodiments of this application relate to the field of audio processing technologies, and specifically, this application relates to a bandwidth extension (BWE) method and apparatus, an electronic device, and a computer-readable storage medium.

BACKGROUND OF THE DISCLOSURE

BWE, also referred to as spectral band replication, is a classic technology in the field of audio encoding. A BWE technology is a parameter encoding technology. Based on BWE, an effective bandwidth can be extended on a receiving end, to improve quality of an audio signal, thereby enabling a user to intuitively feel a more sonorous timbre, a higher volume, and better intelligibility.

In the related art, a classic method for implementing BWE is to use a correlation between a high frequency and a low frequency in a speech signal to perform BWE. In an audio encoding system, the correlation is used as side information. On an encoder side, the side information is combined into a bitstream and transmitted; and on a decoder side, a low-frequency spectrum is sequentially restored through decoding, and a BWE operation is performed to restore a high-frequency spectrum. However, such a method requires the system to consume corresponding bits (for example, based on encoding of information of a low-frequency portion, 10% of additional bits are used to encode the side information), that is, additional bits are required for encoding, and there is a forward compatibility problem.

Another common BWE method is a blind solution based on data analysis. The solution is based on a neural network or deep learning, in which a low-frequency coefficient is inputted, and a high-frequency coefficient is outputted. Such a coefficient-coefficient mapping method requires a high generalization capability of a network. To ensure accurate results, the network has a relatively large depth, a relatively large volume, and high complexity. In an actual implementation, performance of the method is mediocre in scenarios beyond modes included in a training library.

SUMMARY

An objective of embodiments of this application is to overcome at least one of the foregoing technical defects, and the following technical solutions are particularly provided:

One aspect of the present disclosure provides a BWE method that is performed by an electronic device. The method includes performing a time-frequency transform on a to-be-processed narrowband signal to obtain a corresponding initial low-frequency spectrum; obtaining a correlation parameter of a high-frequency portion and a low-frequency portion of a target broadband spectrum based on the initial low-frequency spectrum by using a neural network model, the correlation parameter comprising at least one of a high-frequency spectral envelope and relative flatness information, the relative flatness information representing a correlation between a spectral flatness of the high-frequency portion of the target broadband spectrum and a spectral flatness of the low-frequency portion of the target broadband spectrum; obtaining an initial high-frequency spectrum based on the correlation parameter and the initial low-frequency spectrum; and obtaining a broadband signal according to a target low-frequency spectrum and a target high-frequency spectrum, the target low-frequency spectrum being the initial low-frequency spectrum or a spectrum obtained by filtering the initial low-frequency spectrum, and the target high-frequency spectrum being the initial high-frequency spectrum or a spectrum obtained by filtering the initial high-frequency spectrum.

Another aspect of the present disclosure provides a BWE apparatus. The apparatus includes a low-frequency spectrum determining module, configured to perform a time-frequency transform on a to-be-processed narrowband signal to obtain a corresponding initial low-frequency spectrum; a correlation parameter determining module, configured to obtain a correlation parameter of a high-frequency portion and a low-frequency portion of a target broadband spectrum based on the initial low-frequency spectrum by using a neural network model, the correlation parameter comprising at least one of a high-frequency spectral envelope and relative flatness information, the relative flatness information representing a correlation between a spectral flatness of the high-frequency portion of the target broadband spectrum and a spectral flatness of the low-frequency portion of the target broadband spectrum; a high-frequency spectrum determining module, configured to obtain an initial high-frequency spectrum based on the correlation parameter and the initial low-frequency spectrum; and a broadband signal determining module, configured to obtain a broadband signal according to a target low-frequency spectrum and a target high-frequency spectrum, the target low-frequency spectrum being the initial low-frequency spectrum or a spectrum obtained by filtering the initial low-frequency spectrum, and the target high-frequency spectrum being the initial high-frequency spectrum or a spectrum obtained by filtering the initial high-frequency spectrum.

According to an aspect, an electronic device is provided, including a memory, a processor, and a computer program stored on the memory and executable on the processor, the processor, when executing the program, configured to implement: performing a time-frequency transform on a to-be-processed narrowband signal to obtain a corresponding initial low-frequency spectrum; obtaining a correlation parameter of a high-frequency portion and a low-frequency portion of a target broadband spectrum based on the initial low-frequency spectrum by using a neural network model, the correlation parameter comprising at least one of a high-frequency spectral envelope and relative flatness information, the relative flatness information representing a correlation between a spectral flatness of the high-frequency portion of the target broadband spectrum and a spectral flatness of the low-frequency portion of the target broadband spectrum; obtaining an initial high-frequency spectrum based on the correlation parameter and the initial low-frequency spectrum; and obtaining a broadband signal according to a target low-frequency spectrum and a target high-frequency spectrum, the target low-frequency spectrum being the initial low-frequency spectrum or a spectrum obtained by filtering the initial low-frequency spectrum, and the target high-frequency spectrum being the initial high-frequency spectrum or a spectrum obtained by filtering the initial high-frequency spectrum.

Another aspect of the present disclosure provides a computer-readable storage medium. The computer-readable storage medium storing a computer program, the program, when executed by a processor, implementing the foregoing BWE method.

BRIEF DESCRIPTION OF THE DRAWINGS

The foregoing and/or additional aspects and advantages of embodiments of this application will become apparent and comprehensible in the descriptions of embodiments made with reference to the following accompanying drawings.

DESCRIPTION OF EMBODIMENTS

Figure 1A:
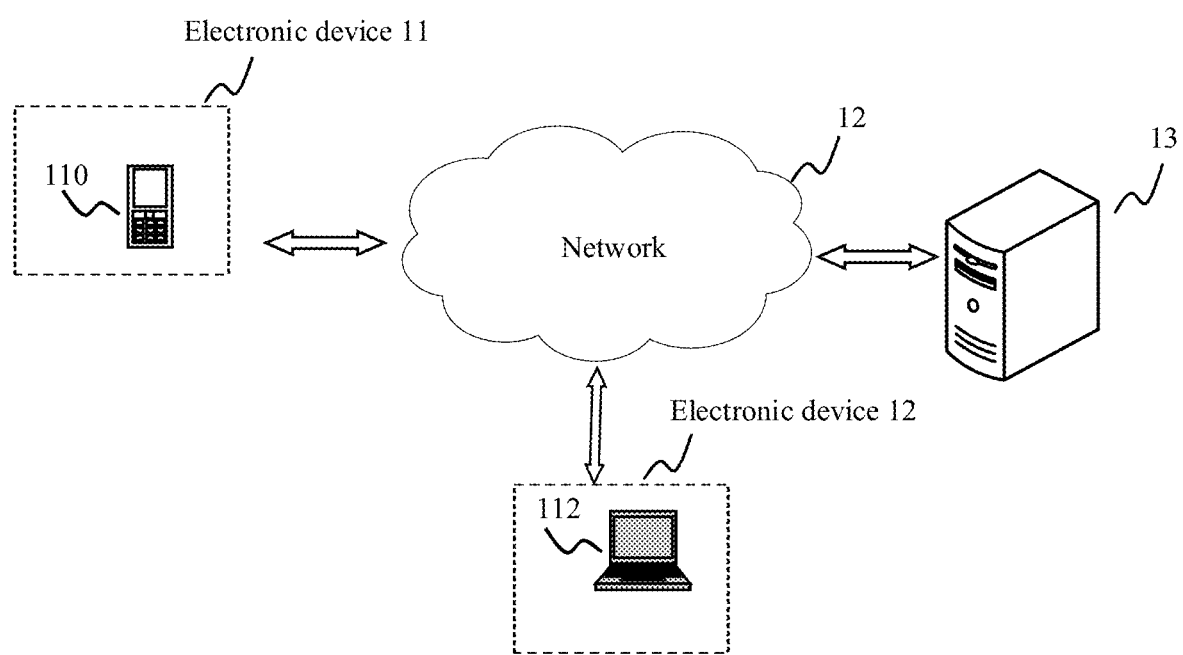
FIG. 1A is a diagram of a scenario of a BWE method according to an embodiment of this application.

Embodiments of this application are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are exemplary, and are only used to interpret this application and cannot be construed as a limitation to this application.

A person skilled in the art may understand that the singular forms "a", "an", "said", and "the" used herein may include the plural forms as well, unless the context clearly indicates otherwise. It is to be further understood that the terms "include" and/or "include" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items. In the embodiments, "a plurality of" means two or more.

To better understand and describe the solutions in the embodiments of this application, the following briefly describes some technical terms involved in the embodiments of this application.

Bandwidth extension (BWE): BWE is a technology of extending a narrowband signal into a broadband signal in the field of audio encoding.

Spectrum: Spectrum is an abbreviation of frequency spectrum density, and is a distribution curve of frequency.

Spectral envelope (SE): SE is an energy representation of spectrum coefficients corresponding to a signal on a frequency axis corresponding to signals, and for a subband, is an energy representation of spectrum coefficients corresponding to the subband, for example, average energy of the spectrum coefficients corresponding to the subband.

Spectral flatness (SF): SF represents a degree of power flatness of a to-be-measured signal in a channel in which the to-be-measured signal is located.

Neural network (NN): NN is an algorithm mathematical model for performing distributed and parallel information processing by imitating behavioral characteristics of animal neural networks. Such a network relies on complexity of a system, and achieves information processing by adjusting interconnection relationships between a large quantity of internal nodes.

Deep learning (DL): DL is one type of machine learning and forms a more abstract high-level representation attribute category or feature by combining low-level features, so as to discover distributed feature representations of data.

Public Switched Telephone Network (PSTN): PSTN is a common old telephone system, that is, a telephone network commonly used in our daily lives.

Voice over Internet Protocol (VoIP): VoIP is a voice call technology, and implements voice calls and multimedia conferences by using the Internet Protocol, that is, performs communication through the Internet.

3rd Generation Partnership Project (3GPP) Enhanced Voice Services (EVS): 3GPP is mainly to formulate third-generation technical specifications of a radio interface based on the Global System for Mobile Communications; and an EVS encoder is a new-generation speech/audio encoder, which not only can provide high audio quality for speech and music signals, but also has strong capabilities to resist a frame loss and a delay jitter, thereby bringing a brand new experience for users.

Internet Engineering Task Force (IETF) Opus: Opus is a lossy sound encoding format developed by the IETF.

SILK: A SILK audio encoder achieves that the Internet-phone Skype provides a SILK broadband of royalty-free authentication to third-party developers and hardware manufacturers.

Specifically, BWE is a classic technology in the field of audio encoding, and in the related art, the BWE may be implemented in the following manners:

First manner: For a narrowband signal with a low sampling rate, a spectrum of a low-frequency portion in the narrowband signal is selected and replicated to a high-frequency portion; and a narrowband signal is extended into a broadband signal according to side information (information used for describing an energy correlation between a high frequency and a low frequency) recorded in advance.

Second manner: For blind BWE, BWE is directly completed without using additional bits. For a narrowband signal with a low sampling rate, technologies, such as a neural network or deep learning, are used. In the neural network or deep learning, a low-frequency spectrum of the narrowband signal is inputted, and a high-frequency spectrum is outputted. The narrowband signal is extended into a broadband signal based on the high-frequency spectrum.

However, if BWE is performed in the first manner, side information therein needs to consume corresponding bots, and there is a forward compatibility problem, for example, a typical PSTN (narrowband voice) and VoIP (broadband voice) interworking scenario. In a PSTN-VoIP transmission direction, broadband voice in the PSTN-VoIP transmission direction cannot be outputted without modifying a transmission protocol (adding a corresponding BWE bitstream). If BWE is performed in the second manner, a low-frequency spectrum is inputted, and a high-frequency spectrum is outputted. In this manner, no additional bits need to be consumed, but a high generalization capability of a network is required. To ensure accuracy of a network output, the network has a relatively large depth, a relatively large volume, and relatively high complexity, and consequently has relatively poor performance. Therefore, neither of the foregoing two BWE manners can satisfy a performance requirement of actual BWE.

In view of the problems in the related art, and to better satisfy actual application requirements, the embodiments of this application provide a BWE method. This method not only requires no additional bits, to reduce the depth and the volume of the network, but also reduces the network complexity.

In the embodiments of this application, the solutions of this application are described by using a PSTN (narrowband voice) and VoIP (broadband voice) interworking scenario as an example. That is, narrowband voice is extended into broadband voice in a PSTN to VoIP (PSTN-VoIP for short) transmission direction. In one embodiment, this application is not limited to the foregoing application scenarios, and is also applicable to other encoding systems, which include, but are not limited to: mainstream audio encoders such as a 3GPP EVS encoder, an IETF Opus encoder, and a SILK encoder.

The following describes the technical solutions of this application and how to resolve the foregoing technical problems according to the technical solutions of this application in detail by using specific embodiments. The following several specific embodiments may be combined with each other, and the same or similar concepts or processes may not be described repeatedly in some embodiments. The following describes the embodiments of this application with reference to the accompanying drawings.

In the following process of describing the solutions of the embodiments of this application by using a speech scenario of PSTN and VoIP interworking as an example, a sampling rate is 8000 Hz, and a frame length of one speech frame is 10 ms (which is equivalent to 80 sample points/frame). In one embodiment, considering that a frame length of a PSTN frame is 20 ms, only two operations need to be performed for each PSTN frame. In the description process of the embodiments of this application, an example in which a data frame length is fixed to 10 ms is used. However, it is clear to a person skilled in the art that, this application is also applicable to a scenario in which the frame length is another value, for example, a scenario in which the frame length is 20 ms (which is equivalent to 160 sample points/frame). This is not limited in this application.

Similarly, the example, in which the sampling rate is 8000 Hz, used in the embodiments of this application is not intended to limit an action range of BWE provided in the embodiments of this application. For example, although in a main embodiment of this application, a signal with a sampling rate of 8000 Hz is extended into a signal with a sampling rate of 16000 Hz through BWE, this application may alternatively be applied to scenarios with other sampling rates, for example, extending a signal with a sampling rate of 16000 Hz into a signal with a sampling rate of 32000 Hz, and extending a signal with a sampling rate of 8000 Hz into a signal with a sampling rate of 12000 Hz. The solutions in the embodiments of this application may be applied to any scenario in which BWE needs to be performed on a signal.

FIG. 1A is a diagram of an application scenario of a BWE method according to an embodiment of this application. As shown in FIG. 1A, an electronic device may include a mobile phone 110 or a notebook computer 112, but is not limited thereto. An example in which the electronic device is the mobile phone 110 is used, and the remaining conditions are similar. The mobile device 110 communicates with a server device 13 through a network 12. In the example, the server device 13 includes a neural network model. The mobile phone 110 inputs a to-be-processed narrowband signal into the neural network model on the server device 13, obtains a broadband signal after BWE by using the method shown in FIG. 1B, and outputs the broadband signal.

Although in the example in FIG. 1A, the neural network model is located on the server device 13, in another implementation, the neural network model may be located on the electronic device (not shown in the figure).

Figure 1B:
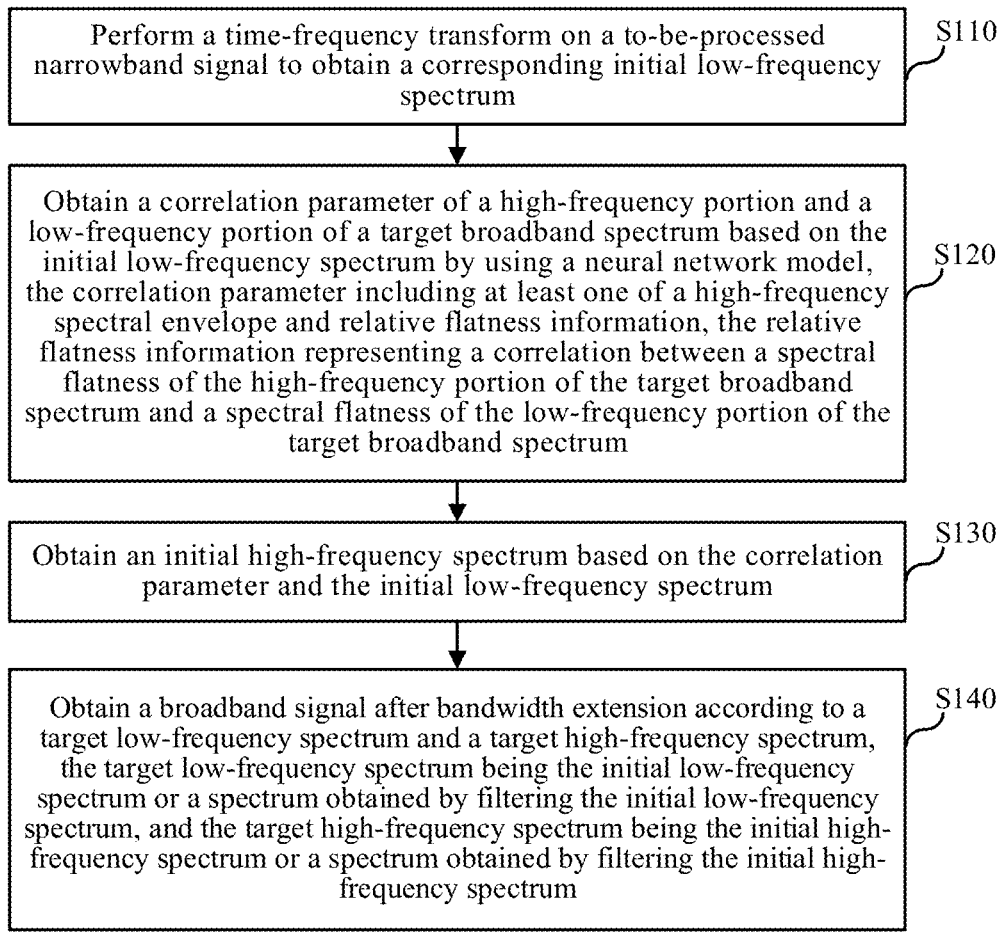
FIG. 1B is a schematic flowchart of a BWE method according to an embodiment of this application.

An example in this application provides a BWE method. The method is performed by an electronic device shown in FIG. 6. The electronic device may be a terminal or a server. The terminal may be a desktop device or a mobile terminal. The server may be an independent physical server, a physical server cluster, or a virtual server. As shown in FIG. 1B, the method includes the following steps:

Step S110: Perform a time-frequency transform on a to-be-processed narrowband signal to obtain a corresponding initial low-frequency spectrum.

Specifically, an initial low-frequency spectrum is obtained by performing a time-frequency transform on a narrowband signal. The time-frequency transform includes, but is not limited to, a Fourier transform, a discrete cosine transform, a discrete sine transform, a wavelet transform, and the like. The to-be-processed narrowband signal may be a speech frame signal that requires BWE. For example, in a PSTN-VoIP channel, if a PSTN narrowband speech signal needs to be extended into a VoIP broadband speech signal, the to-be-processed narrowband signal may be the PSTN narrowband speech signal. If the to-be-processed narrowband signal is a signal of a speech frame, the to-be-processed narrowband signal may be all or some of speech signals of one speech frame.

In one embodiment, for a to-be-processed signal, the signal may be used as a to-be-processed narrowband signal for completing BWE at a time, or the signal may be divided into a plurality of sub-signals, and the plurality of sub-signals are separately processed. For example, a frame length of the PSTN frame is 20 ms, and BWE may be performed once on a signal of the speech frame of 20 ms; or the speech frame of 20 ms may be divided into two speech frames of 10 ms, and BWE is separately performed on the two speech frames of 10 ms.

Step S120: Obtain a correlation parameter of a high-frequency portion and a low-frequency portion of a target broadband spectrum based on the initial low-frequency spectrum by using a neural network model, the correlation parameter including at least one of a high-frequency spectral envelope and relative flatness information, the relative flatness information representing a correlation between a spectral flatness of the high-frequency portion of the target broadband spectrum and a spectral flatness of the low-frequency portion of the target broadband spectrum.

Specifically, the neural network model may be a model pre-trained based on a low-frequency spectrum of the signal. The model is configured to predict a correlation parameter of the signal. The target broadband spectrum is a spectrum corresponding to a broadband signal obtained after expending a bandwidth of a narrowband signal, and is obtained based on a low-frequency spectrum of a to-be-processed speech signal. For example, the target broadband spectrum may be obtained by replicating the low-frequency spectrum of the to-be-processed speech signal.

Step S130: Obtain an initial high-frequency spectrum based on the correlation parameter and the initial low-frequency spectrum.

Specifically, an initial high-frequency spectrum (that is, a parameter corresponding to a high-frequency portion of a broadband signal) of a to-be-extended-into broadband signal can be predicted based on an initial low-frequency spectrum (a parameter corresponding to a low-frequency portion).

Step S140: Obtain a broadband signal after BWE according to a target low-frequency spectrum and a target high-frequency spectrum, the target low-frequency spectrum being the initial low-frequency spectrum, or a spectrum obtained by filtering the initial low-frequency spectrum, and the target high-frequency spectrum being the initial high-frequency spectrum or a spectrum obtained by filtering the initial high-frequency spectrum.

Specifically, in a process of determining the initial low-frequency spectrum of the to-be-processed narrowband signal, the narrowband signal usually needs to be quantized, and quantization noise is generally introduced during the quantization. Therefore, in the process of obtaining the broadband signal after BWE, the initial low-frequency spectrum may be filtered to obtain a corresponding target low-frequency spectrum, so as to filter out quantization noise in the initial low-frequency spectrum; and then, a broadband signal after BWE is obtained based on the target low-frequency spectrum, to prevent the quantization noise from being extended into the broadband signal.

Specifically, in the process of obtaining the broadband signal after BWE, the initial high-frequency spectrum may be first filtered to obtain a corresponding target high-frequency spectrum, so as to effectively filter out noise that may exist in the initial high-frequency spectrum; and then the broadband signal after BWE is obtained based on the target high-frequency spectrum, to improve signal quality of the broadband signal, thereby further improving the listening experience of users.

In other words, the obtaining a broadband signal after BWE according to a target low-frequency spectrum and a target high-frequency spectrum includes any one of the following cases:

One case: If only the initial low-frequency spectrum is filtered, that is, the target low-frequency spectrum is a spectrum obtained by filtering the initial low-frequency spectrum, and the target high-frequency spectrum is the initial high-frequency spectrum, the obtaining a broadband signal after BWE according to a target low-frequency spectrum and a target high-frequency spectrum may be: obtaining the broadband signal after BWE according to the initial high-frequency spectrum (having not been filtered) and the target low-frequency spectrum. A specific process of obtaining the broadband signal after BWE according to the initial high-frequency spectrum and the target low-frequency spectrum may be: first combining the initial high-frequency spectrum and the target low-frequency spectrum, and then performing a time-frequency inverse transform (namely, a frequency-time transform) on a combined spectrum, to obtain a new broadband signal, thereby implementing BWE of the to-be-processed narrowband signal.

Another case: If only the initial high-frequency spectrum is filtered, that is, the target high-frequency spectrum is a spectrum obtained by filtering the initial high-frequency spectrum, and the target low-frequency spectrum is the initial low-frequency spectrum, the obtaining a broadband signal after BWE according to a target low-frequency spectrum and a target high-frequency spectrum may be: obtaining the broadband signal after BWE according to the initial low-frequency spectrum (having not been filtered) and the target high-frequency spectrum. A specific process of obtaining the broadband signal after BWE according to the initial low-frequency spectrum and the target high-frequency spectrum may be: first combining the initial low-frequency spectrum and the target high-frequency spectrum, and then performing a time-frequency inverse transform (namely, a frequency-time transform) on a combined spectrum, to obtain a new broadband signal, thereby implementing BWE of the to-be-processed narrowband signal.

Still another case: If both the initial low-frequency spectrum and the initial high-frequency spectrum are filtered, that is, the target high-frequency spectrum is a spectrum obtained by filtering the initial high-frequency spectrum, and the target low-frequency spectrum is a spectrum obtained by filtering the initial low-frequency spectrum, the obtaining a broadband signal after BWE according to a target low-frequency spectrum and a target high-frequency spectrum may be: first combining the target low-frequency spectrum and the target high-frequency spectrum, and then performing a time-frequency inverse transform (namely, a frequency-time transform) on a combined spectrum, to obtain a new broadband signal, thereby implementing BWE of the to-be-processed narrowband signal.

A bandwidth of the extended broadband signal is greater than a bandwidth of the to-be-processed narrowband signal, so that a speech frame with a sonorous timbre and a relatively high volume can be obtained based on the broadband signal, thereby providing a better listening experience for users.

In the BWE method provided in the embodiments of this application, in a process of obtaining a broadband signal after BWE according to a target low-frequency spectrum and a target high-frequency spectrum, at least one of an initial low-frequency spectrum or an initial high-frequency spectrum is filtered. Therefore, the initial low-frequency spectrum can be filtered before a broadband signal is obtained, so that quantization noise that may be introduced during quantization of a narrowband signal is effectively filtered out; and the initial high-frequency spectrum can alternatively be filtered, so that noise introduced during BWE based on the initial low-frequency spectrum is effectively filtered out, thereby enhancing signal quality of the broadband signal and further improving the listening experience of users. In addition, when BWE is performed by using the method in this solution, no side information needs to be recorded in advance, that is, no additional bandwidth is required.

In one embodiment, the target broadband spectrum is a spectrum corresponding to a broadband signal (target broadband signal) into which the narrowband signal is to be extended, and the target broadband spectrum is obtained based on a low-frequency spectrum of a to-be-processed speech signal. For example, the target broadband spectrum may be obtained by replicating the low-frequency spectrum of the to-be-processed speech signal.

Specifically, the neural network model may be a model pre-trained based on sample data. Each piece of sample data includes a sample narrowband signal and a sample broadband signal corresponding to the sample narrowband signal. For each piece of sample data, a correlation parameter (the parameter may be understood as annotation information of the sample data, that is, a sample label, which is referred to as an annotation result for short) of a high-frequency portion and a low-frequency portion of a spectrum of a sample broadband signal of each piece of sample data can be determined. The correlation parameter includes a high-frequency spectral envelope, and may further include relative flatness information of the high-frequency portion and the low-frequency portion of the spectrum of the sample broadband signal. When the neural network model is trained based on the sample data, an input of an initial neural network model is a low-frequency spectrum of a sample narrowband signal, and an output of the initial neural network model is a predicted correlation parameter (prediction result for short). Whether training of the model ends may be determined based on a similarity between a prediction result and an annotation result that correspond to each piece of sample data. For example, whether the training of the model ends is determined depending on whether a loss function of the model converges, the loss function representing a degree of difference between a prediction result and an annotation result of each piece of sample data. A model obtained when the training ends is used as the neural network model during application of this embodiment.

In an application stage of the neural network model, for the narrowband signal, a low-frequency spectrum of the narrowband signal can be inputted into the trained neural network model, to obtain a correlation parameter corresponding to the narrowband signal. Because when the model is trained based on the sample data, a sample label of the sample data is the correlation parameter of the high-frequency portion and the low-frequency portion of the sample broadband signal, the correlation parameter of the narrowband signal is obtained based on an output of the neural network model, so that the correlation parameter can well represent a correlation between the high-frequency portion and the low-frequency portion of the spectrum of the target broadband signal.

Specifically, because the correlation parameter can represent a correlation between a high-frequency portion and a low-frequency portion of the target broadband spectrum, an initial high-frequency spectrum of a broadband signal (that is, a parameter corresponding to a high-frequency portion of the broadband signal) into which the narrowband signal needs to be extended can be predicted based on the correlation parameter and the initial low-frequency spectrum (a parameter corresponding to the low-frequency portion).

In this implementation, the correlation parameter of the high-frequency portion and the low-frequency portion of the target broadband spectrum can be obtained based on the initial low-frequency spectrum of the to-be-processed narrowband signal by using the neural network model. Because the prediction is performed by using the neural network model, no additional bits are required for encoding. This implementation is a blind analysis method, has relatively good forward compatibility, achieves a spectrum parameter-to-correlation parameter mapping because an output of the model is a parameter that can reflect the correlation between the high-frequency portion and the low-frequency portion of the target broadband spectrum, compared with the existing coefficient-to-coefficient mapping manner, achieves a better generalization capability, and can obtain a signal with a sonorous timbre and a relatively high volume, thereby providing a better listening experience for users.

In one embodiment of this application, the initial low-frequency spectrum is obtained by performing a time-frequency transform on a to-be-processed narrowband signal. The time-frequency transform includes, but is not limited to, a Fourier transform, a discrete cosine transform, a discrete sine transform, a wavelet transform, and the like.

The determining an initial low-frequency spectrum of the to-be-processed narrowband signal may include:

performing upsampling processing, of which a sampling factor is a first set value, on the narrowband signal, to obtain an upsampled signal;

performing a time-frequency transform on the upsampled signal to obtain a low-frequency domain coefficient; and determining the low-frequency domain coefficient as the initial low-frequency spectrum.

A manner of determining the initial low-frequency spectrum is further described below in detail with reference to an example. In the example, a description is made by using the foregoing speech scenario of PSTN and VoIP interworking, a sampling rate of a speech signal being 8000 Hz, and a frame length of a speech frame being 10 ms, as an example.

In the example, a sampling rate of a PSTN signal is 8000 Hz, and according to the Nyquist sampling theorem, an effective bandwidth of the narrowband signal is 4000 Hz. An objective of this example is to obtain a signal with a bandwidth of 8000 Hz after BWE is performed on the narrowband signal, that is, a bandwidth of the broadband signal is 8000 Hz. Considering that in an actual voice communication scenario, for a signal with an effective bandwidth of 4000 Hz, an upper bound of a general effective bandwidth thereof is 3500 Hz. Therefore, in this solution, an effective bandwidth of actually obtained broadband signal is 7000 Hz, so that an objective of this example is to perform BWE on a narrowband signal with a bandwidth of 3500 Hz to obtain a broadband signal with a bandwidth of 7000 Hz, that is, to extend a signal with a sampling rate of 8000 Hz into a signal with a sampling rate of 16000 Hz through BWE.

In this example, a sampling factor is 2, and upsampling processing with a sampling factor of 2 is performed on the narrowband signal, to obtain an upsampled signal with a sampling rate of 16000 Hz. Because the sampling rate of the narrowband signal is 8000 Hz, and a frame length is 10 ms, the upsampled signal corresponds to 160 sample points.

Subsequently, a time-frequency transform is performed on the upsampled signal, to obtain an initial low-frequency domain coefficient. After the initial low-frequency domain coefficient is obtained, the initial low-frequency domain coefficient may be used as an initial low-frequency spectrum for subsequent calculation of a low-frequency spectral envelope, a low-frequency amplitude spectrum, and the like.

Specifically, the Fourier transform may be a short-time Fourier transform (STFT), and the discrete cosine transform may be a modified discrete cosine transform (MDCT). In a process of performing a time-frequency transform on the upsampled signal, in consideration of elimination of discontinuity of inter-frame data, frequency points corresponding to a previous speech frame and frequency points corresponding to a current speech frame (the to-be-processed narrowband signal) may be combined into an array, and windowing is performed on the frequency points in the array, to obtain a windowed signal.

Specifically, when the time-frequency transform is an STFT, windowing may be performed by using a Hanning window. After windowing using the Hanning window is performed, an STFT may be performed on the windowed signal, to obtain a corresponding low-frequency domain coefficient. In consideration of a conjugate symmetry relationship of the Fourier transform, a first coefficient is a direct-current component. If M low-frequency domain coefficients are obtained, (1+M/2) low-frequency domain coefficients may be selected for subsequent processing.

In an example, a specific process of performing an STFT on the upsampled signal including 160 sample points is: combining 160 sample points corresponding to the previous speech frame and 160 sample points corresponding to the current speech frame (the to-be-processed narrowband signal) into an array, the array including 320 sample points; then performing windowing using a Hanning window on the sample points in the array, to obtain a windowed signal $s_{Low}(i, j)$, and subsequently, performing a Fourier transform on $s_{Low}(i, j)$, to obtain 320 low-frequency domain coefficients $S_{Low}(i, j)$, where i is a frame index of a speech frame, and j is an intra-frame sample index (j=0, 1, ..., 319). In consideration of a conjugate symmetry relationship of the Fourier transform, a first coefficient is a direct-current component. Therefore, only first 161 low-frequency domain coefficients may be considered. That is, the second low-frequency domain coefficient to the $161^{st}$ low-frequency domain coefficient in the 161 low-frequency domain coefficients are used as the initial low-frequency spectrum.

Specifically, when the time-frequency transform is an MDCT, windowing may be performed by using a cosine window. After windowing using a cosine window is performed, an MDCT may be performed on the windowed signal, to obtain a corresponding low-frequency domain coefficient, and subsequent processing is performed based on the low-frequency domain coefficient. Assuming that the windowed signal is $s_{Low}(i, j)$, where i is a frame index of a speech frame, j is an intra-frame sample index (j=0, 1, ..., 319), then an MDCT for 320 points may be performed on $s_{Low}(i, j)$, to obtain MDCT coefficients $S_{Low}(i, j)$ of 160 points, where i is a frame index of a speech frame, and j is an intra-frame sample index (j=0, 1, ..., 159); and the MDCT coefficients of the 160 points are used as low-frequency domain coefficients.

When the narrowband signal is a signal with a sampling rate of 8000 Hz and a bandwidth of 0 to 3500 Hz, based on the sampling rate and a frame length of the narrowband signal, it can be determined that there are actually 70 low-frequency domain coefficients having effective data. That is, there are 70 effective coefficients of the initial low-frequency spectrum $S_{Low}(i, j)$, that is, j=0, 1, ..., 69. The following describes a subsequent processing process in detail also by using the 70 initial low-frequency spectra as an example.

In one embodiment, the time-frequency transform includes a Fourier transform or a discrete cosine transform. After the time-frequency transform is performed on the to-be-processed narrowband signal to obtain the initial low-frequency spectrum, if the time-frequency transform is a Fourier transform (for example, an STFT), the initial low-frequency spectrum is in a complex form, so that a low-frequency amplitude spectrum in a real number form may be first obtained according to the initial low-frequency spectrum in a complex form, and then subsequent processing is performed based on the low-frequency amplitude spectrum. That is, in the process of obtaining a correlation parameter of a high-frequency portion and a low-frequency portion of a target broadband spectrum based on the initial low-frequency spectrum by using a neural network model, a low-frequency amplitude spectrum of the narrowband signal may be first obtained according to the initial low-frequency spectrum; and then the low-frequency amplitude spectrum is inputted into the neural network model, and the correlation parameter of the high-frequency portion and the low-frequency portion of the target broadband spectrum is obtained based on an output of the neural network model. If the time-frequency transform is a discrete cosine transform (for example, an MDCT), the initial low-frequency spectrum is in a real number form, so that subsequent processing may be directly performed according to the initial low-frequency spectrum in a real number form. That is, in the process of obtaining a correlation parameter of a high-frequency portion and a low-frequency portion of a target broadband spectrum based on the initial low-frequency spectrum by using a neural network model, the initial low-frequency spectrum may be inputted into the neural network model, and the correlation parameter of the high-frequency portion and the low-frequency portion of the target broadband spectrum is obtained based on an output of the neural network model.

Specifically, when the time-frequency transform is a discrete sine transform, a wavelet transform, or the like, reference may be made to the foregoing processing process of the Fourier transform or discrete cosine transform according to requirements, to obtain the correlation parameter of the high-frequency portion and the low-frequency portion of the target broadband spectrum based on the initial low-frequency spectrum by using the neural network model. Details are not described herein again.

In one embodiment, the following operation step is further included:

determining a low-frequency spectral envelope of the to-be-processed narrowband signal based on the initial low-frequency spectrum, an input of the neural network model further including the low-frequency spectral envelope.

Specifically, when the time-frequency transform is a Fourier transform (for example, an STFT), after the initial low-frequency spectrum is obtained, a low-frequency amplitude spectrum of the narrowband signal may be further obtained according to the initial low-frequency spectrum. After the low-frequency amplitude spectrum is obtained, a low-frequency spectral envelope of the narrowband signal may be further determined according to the low-frequency amplitude spectrum. That is, the low-frequency spectral envelope of the narrowband signal is determined based on the initial low-frequency spectrum. When the time-frequency transform is a discrete cosine transform (for example, an MDCT), after the initial low-frequency spectrum is obtained, a low-frequency spectral envelope of the narrowband signal may be determined according to the initial low-frequency spectrum. That is, the low-frequency spectral envelope of the narrowband signal is determined based on the initial low-frequency spectrum. After the low-frequency spectral envelope of the narrowband signal is determined, the low-frequency spectral envelope may be used as an input of the neural network model. That is, the input of the neural network model further includes the low-frequency spectral envelope.

Specifically, to enrich data inputted into the neural network model, a parameter related to a spectrum of a low-frequency portion may further be selected as an input of the neural network model. The low-frequency spectral envelope of the narrowband signal is information related to the spectrum of the signal, then the low-frequency spectral envelope may be used as an input of the neural network model, so that a more accurate correlation parameter can be obtained based on the low-frequency spectral envelope and the low-frequency spectrum (when the time-frequency transform is an MDCT). That is, a correlation parameter can be obtained by inputting the low-frequency spectral envelope and the initial low-frequency spectrum into the neural network model. Alternatively, a more accurate correlation parameter is obtained based on the low-frequency spectral envelope and the low-frequency amplitude spectrum (when the time-frequency transform is an STFT), so that a correlation parameter can be obtained by inputting the low-frequency spectral envelope and the low-frequency amplitude spectrum into the neural network model.

In a case, when the time-frequency transform is a Fourier transform (for example, an STFT), after the initial low-frequency spectrum is obtained, a low-frequency amplitude spectrum of the narrowband signal can be determined based on the initial low-frequency spectrum. Specifically, the low-frequency amplitude spectrum can be calculated by using the following Formula (1):

$$P_{Low}(i,j) = \text{SQRT}(\text{Real}(S_{Low}(i,j))^2 + \text{Imag}(S_{Low}(i,j))^2) \quad (1)$$

where $P_{Low}(i, j)$ represents the low-frequency amplitude spectrum, $S_{Low}(i, j)$ is the initial low-frequency spectrum, Real and Imag are respectively a real part and an imaginary part of the initial low-frequency spectrum, and SQRT is a square root finding operation. If the narrowband signal is a signal with a sampling rate of 8000 Hz and a bandwidth of 0 to 3500 Hz, spectrum coefficients (low-frequency amplitude spectrum coefficients) $P_{Low}(i, j)$, where $j=0, 1, \ldots, 69$), of 70 low-frequency amplitude spectra may be determined based on the sampling rate and a frame length of the narrowband signal by using the low-frequency domain coefficients. In one embodiment, the 70 calculated low-frequency amplitude spectrum coefficients may be directly used as a low-frequency amplitude spectrum of the narrowband signal. Further, for ease of calculation, the low-frequency amplitude spectrum may be further transformed into a logarithmic domain. That is, a logarithm operation is performed on the amplitude spectrum calculated by using Formula (1), and an amplitude spectrum obtained through the logarithm operation is used as a low-frequency amplitude spectrum during subsequent processing.

After a low-frequency amplitude spectrum including the 70 coefficients is obtained according to Formula (1), a low-frequency spectral envelope of the narrowband signal can be determined based on the low-frequency amplitude spectrum.

In the solution of this embodiment, the method may further include:

dividing the low-frequency amplitude spectrum into a fourth quantity of amplitude sub-spectra; and respectively determining a sub-spectral envelope corresponding to each amplitude sub-spectrum, the low-frequency spectral envelope including the determined fourth quantity of sub-spectral envelopes.

Specifically, one embodiment of dividing spectrum coefficients of the low-frequency amplitude spectrum into the fourth quantity (which is recorded as M) of amplitude sub-spectra is: performing band division on the narrowband signal, to obtain M amplitude sub-spectra. Subbands may correspond to the same quantity or different quantities of spectrum coefficients of amplitude sub-spectra. A total quantity of spectrum coefficients corresponding to all the subbands is equal to a quantity of spectrum coefficients of the low-frequency amplitude spectrum.

After the M amplitude sub-spectra are obtained through division, a sub-spectral envelope corresponding to each amplitude sub-spectrum may be determined based on each amplitude sub-spectrum. One embodiment is that: a sub-spectral envelope of each subband, that is, a sub-spectral envelope corresponding to each amplitude sub-spectrum, may be determined based on spectrum coefficients of the low-frequency amplitude spectrum that correspond to each amplitude sub-spectrum. M sub-spectral envelopes may be correspondingly determined for M amplitude sub-spectra, and then the low-frequency spectral envelope includes the M determined sub-spectral envelopes.

In an example, for the foregoing 70 spectrum coefficients (which may be coefficients calculated based on Formula (1) or coefficients calculated based on Formula (1) and then transformed into a logarithmic domain) of the low-frequency amplitude spectrum, if each subband includes the same quantity of spectrum coefficients, for example, five spectrum coefficients, which is recorded as $N=5$, then a band corresponding to spectrum coefficients of every five amplitude sub-spectra may be divided into one subband. In this case, 14 ($M=14$) subbands are obtained through division, and each subband corresponds to five spectrum coefficients. Therefore, after 14 amplitude sub-spectra are obtained through division, 14 sub-spectral envelopes can be determined based on the 14 amplitude sub-spectra.

The determining a sub-spectral envelope corresponding to each amplitude sub-spectrum may include:

obtaining the sub-spectral envelope corresponding to each amplitude sub-spectrum based on logarithm values of spectrum coefficients included in each amplitude sub-spectrum.

Specifically, a sub-spectral envelope corresponding to each amplitude sub-spectrum is determined based on spectrum coefficients of each amplitude sub-spectrum by using Formula (2).

Formula (2) is:

$$e_{Low}(i, k) = \frac{\sum_{j=0}^{4} \log(P_{Low}(i, k*5 + j))}{5} \quad (2)$$

where $e_{Low}(i, k)$ represents a sub-spectral envelope, i is a frame index of a speech frame, k represents an index number of a subband, there are M subbands in total, and $k=0, 1, 2, \ldots, M$, so that the low-frequency spectral envelope includes M sub-spectral envelopes.

Generally, a spectral envelope of a subband is defined as average energy (or further transformed into a logarithmic representation) of adjacent coefficients. However, this manner may cause a coefficient with a relatively small amplitude to fail to play a substantive role. This embodiment provides a solution of directly averaging logarithm identities of spectrum coefficients included in each amplitude sub-spectrum to obtain a sub-spectral envelope corresponding to each amplitude sub-spectrum, which, compared with an existing common envelope determining solution, can better protect a coefficient with a relatively small amplitude in distortion control during training of the neural network model, so that more signal parameters can play corresponding roles in the BWE.

Therefore, if the low-frequency amplitude spectrum and the low-frequency spectral envelope are used as an input of the neural network model, the low-frequency amplitude spectrum is 70-dimensional data, and the low-frequency spectral envelope is 14-dimensional data, the input of the model is 84-dimensional data. In this way, the neural network model in this solution has a small volume and low complexity.

In another case, when the time-frequency transform is a discrete cosine transform (for example, an MDCT), after the initial low-frequency spectrum is obtained, a low-frequency spectral envelope of the narrowband signal can be determined based on the initial low-frequency spectrum. Specifically, band division may be performed on the narrowband signal. For 70 low-frequency domain coefficients, a band corresponding to every five adjacent low-frequency domain coefficients may be divided into one subband, and a total of 14 subbands are obtained through division, each subband corresponding to five low-frequency domain coefficients. For each subband, a low-frequency spectral envelope of each subband is defined as average energy of adjacent low-frequency domain coefficients. The low-frequency spectral envelope may be specifically calculated by using Formula (3):

$$e_{Low}(i, k) = \sqrt{\frac{\sum_{j=0}^{4}(S_{Low}(i, k*5 + j))^2}{5}} \quad (3)$$

where $e_{Low}(i, k)$ represents a sub-spectral envelope (a low-frequency spectral envelope of each subband), $S_{Low}(i, j)$ is the initial low-frequency spectrum, k represents an index number of a subband, there are 14 subbands in total, and k=0, 1, 2, . . . , 13, so that the low-frequency spectral envelope includes 14 sub-spectral envelopes.

Therefore, a 70-dimensional low-frequency domain coefficient $S_{Low\_rev}(i, j)$ and a 14-dimensional low-frequency spectral envelope $e_{Low}(i, k)$ may be used as an input of the neural network model, that is, the input of the neural network model is 84-dimensional data.

In the solution of this embodiment, if the time-frequency transform is a Fourier transform, a process of obtaining a target high-frequency spectrum based on the correlation parameter and the initial low-frequency spectrum may include:

obtaining a low-frequency spectral envelope of the to-be-processed narrowband signal according to the initial low-frequency spectrum;

generating an initial high-frequency amplitude spectrum based on a low-frequency amplitude spectrum;

adjusting the initial high-frequency amplitude spectrum based on the high-frequency spectral envelope and the low-frequency spectral envelope, to obtain a target high-frequency amplitude spectrum;

generating a corresponding high-frequency phase spectrum based on a low-frequency phase spectrum of the narrowband signal; and obtaining the target high-frequency spectrum according to the target high-frequency amplitude spectrum and the high-frequency phase spectrum.

When the time-frequency transform is a discrete cosine transform, a process of obtaining an initial high-frequency spectrum based on the correlation parameter and the initial low-frequency spectrum may include:

obtaining a low-frequency spectral envelope of the narrowband signal according to the initial low-frequency spectrum;

generating a first high-frequency spectrum based on the initial low-frequency spectrum; and adjusting the first high-frequency spectrum based on the high-frequency spectral envelope and the low-frequency spectral envelope, to obtain the initial high-frequency spectrum.

Specifically, when the time-frequency transform is a Fourier transform, the foregoing manner of generating a corresponding high-frequency phase spectrum based on a low-frequency phase spectrum of the narrowband signal may include, but is not limited to, any one of the following manners:

First manner: A corresponding high-frequency phase spectrum is obtained by replicating the low-frequency phase spectrum.

Second manner: The low-frequency phase spectrum is flipped, and a phase spectrum the same as the low-frequency phase spectrum is obtained after the flipping. The two low-frequency phase spectra are mapped to corresponding high-frequency points, to obtain a corresponding high-frequency phase spectrum.

Specifically, when the time-frequency transform is a Fourier transform, in the process of generating an initial high-frequency amplitude spectrum based on a low-frequency amplitude spectrum, the initial high-frequency amplitude spectrum may be obtained by replicating the low-frequency amplitude spectrum. It may be understood that in an actual application, for a specific manner of replicating the low-frequency amplitude spectrum, the replicating manner may differ as a bandwidth of the broadband signal that needs to be finally obtained and a bandwidth of a low-frequency amplitude spectrum part that is selected for replication differ. For example, it is assumed that a bandwidth of the broadband signal is twice a bandwidth of the narrowband signal. If the entire low-frequency amplitude spectrum of the narrowband signal is selected for replication, replication only needs to be performed once. If a part of the low-frequency amplitude spectrum of the narrowband signal is selected for replication, replication needs to be performed a corresponding quantity of times according to a bandwidth corresponding to the selected part. If ½ of the low-frequency amplitude spectrum of the narrowband signal is selected for replication, replication needs to be performed twice. If ¼ of the low-frequency amplitude spectrum of the narrowband signal is selected for replication, replication needs to be performed four times.

In an example, if a bandwidth of an extended broadband signal is 7 k Hz, and a bandwidth corresponding to a low-frequency amplitude spectrum selected for replication is 1.75 k Hz, the bandwidth corresponding to the low-frequency amplitude spectrum may be replicated three times based on the bandwidth corresponding to the low-frequency amplitude spectrum and the bandwidth of the extended broadband signal, to obtain a bandwidth (5.25 k Hz) corresponding to the initial high-frequency amplitude spectrum. If a bandwidth corresponding to a low-frequency amplitude spectrum selected for replication is 3.5 k Hz, and a bandwidth of an extended broadband signal is 7 k Hz, a bandwidth (3.5 k Hz) corresponding to the initial high-frequency amplitude spectrum can be obtained by replicating the bandwidth corresponding to the low-frequency amplitude spectrum once.

Specifically, when the time-frequency transform is a discrete cosine transform, in the process of generating a first high-frequency spectrum based on the initial low-frequency spectrum, the initial low-frequency spectrum may be replicated to obtain the first high-frequency spectrum. A process of replicating the initial low-frequency spectrum is similar to a process of replicating the low-frequency amplitude spectrum to obtain the initial high-frequency amplitude spectrum for a Fourier transform. Details are not described herein again.

When the time-frequency transform is a discrete sine transform, a wavelet transform, or the like, in a process of generating the initial high-frequency amplitude spectrum, reference may be made to the generation process of the initial high-frequency amplitude spectrum in the foregoing Fourier transform according to requirements. Certainly, in a process of generating the first high-frequency spectrum, reference may alternatively be made to the generation process of the first high-frequency spectrum in the foregoing discrete cosine transform according to requirements. Details are not described herein again.

In one embodiment, an implementation of the generating an initial high-frequency amplitude spectrum based on a low-frequency amplitude spectrum may be: replicating an amplitude spectrum of a high-frequency band portion in the low-frequency amplitude spectrum, to obtain an initial high-frequency amplitude spectrum; and an implementation of the generating a first high-frequency spectrum based on the initial low-frequency spectrum may be: replicating a spectrum of a high-frequency band portion in the initial low-frequency spectrum, to obtain the first high-frequency spectrum.

Specifically, when the time-frequency transform is a Fourier transform, a low-frequency band portion of the obtained low-frequency amplitude spectrum includes a large quantity of harmonic waves, which affects signal quality of an extended broadband signal. Therefore, an amplitude spectrum of the high-frequency band portion in the low-frequency amplitude spectrum may be selected for replication, to obtain an initial high-frequency amplitude spectrum.

In an example, descriptions are continued by using the foregoing scenario as an example. The low-frequency amplitude spectrum corresponds to 70 frequency points in total. If the $35^{th}$ frequency point to the $69^{th}$ frequency point that correspond to the low-frequency amplitude spectrum (an amplitude spectrum of a high-frequency band portion in the low-frequency amplitude spectrum) are selected as to-be-replicated frequency points, that is, a "master", and a bandwidth of an extended broadband signal is 7000 Hz, the selected frequency points corresponding to the low-frequency amplitude spectrum need to be replicated to obtain an initial high-frequency amplitude spectrum including 70 frequency points. To obtain the initial high-frequency amplitude spectrum including 70 frequency points, the $35^{th}$ frequency point to the $69^{th}$ frequency point that correspond to the low-frequency amplitude spectrum, which are 35 frequency points in total, may be replicated twice, to generate an initial high-frequency amplitude spectrum. Similarly, if the $0^{th}$ frequency point to the $69^{th}$ frequency point that correspond to the low-frequency amplitude spectrum are selected as to-be-replicated frequency points, and a bandwidth of an extended broadband signal is 7000 Hz, the $0^{th}$ frequency point to the $69^{th}$ frequency point that correspond to the low-frequency amplitude spectrum, which are 70 frequency points in total, may be replicated once to generate an initial high-frequency amplitude spectrum. The initial high-frequency amplitude spectrum includes 70 frequency points in total.

A signal corresponding to the low-frequency amplitude spectrum may include a large quantity of harmonic waves, and a signal corresponding to an initial high-frequency amplitude spectrum that is obtained merely through replication also includes a large quantity of harmonic waves. Therefore, to reduce harmonic waves in the broadband signal after BWE, the initial high-frequency amplitude spectrum may be adjusted based on a difference between a high-frequency spectral envelope and a low-frequency spectral envelope, and the adjusted initial high-frequency amplitude spectrum is used as a target high-frequency amplitude spectrum, thereby reducing harmonic waves in the broadband signal that is finally obtained after BWE.

Specifically, when the time-frequency transform is a discrete cosine transform, similarly, a low-frequency band portion of the initial low-frequency spectrum includes a large quantity of harmonic waves, which affects signal quality of an extended broadband signal. Therefore, a spectrum of a high-frequency band portion in the initial low-frequency spectrum may be selected for replication, to obtain a first high-frequency spectrum. This is similar to the process of replicating the amplitude spectrum of the high-frequency band portion in the low-frequency amplitude spectrum to obtain an initial high-frequency amplitude spectrum in a case of a Fourier transform. Details are not described herein again.

When the time-frequency transform is a discrete sine transform, a wavelet transform, or the like, for a process of generating the initial high-frequency amplitude spectrum, reference may be made to the generation process of the initial high-frequency amplitude spectrum in the foregoing Fourier transform according to requirements. Certainly, for a process of generating the first high-frequency spectrum, reference may alternatively be made to the generation process of the first high-frequency spectrum in the foregoing discrete cosine transform according to requirements. Details are not described herein again.

In the solution of this embodiment, both the high-frequency spectral envelope and the low-frequency spectral envelope are spectral envelopes in a logarithmic domain.

The adjusting the initial high-frequency amplitude spectrum based on the high-frequency spectral envelope and the low-frequency spectral envelope, to obtain a target high-frequency amplitude spectrum, may include:

determining a first difference between the high-frequency spectral envelope and the low-frequency spectral envelope; and adjusting the initial high-frequency amplitude spectrum based on the first difference, to obtain the target high-frequency amplitude spectrum.

The adjusting the first high-frequency spectrum based on the high-frequency spectral envelope and the low-frequency spectral envelope includes:

determining a second difference between the high-frequency spectral envelope and the low-frequency spectral envelope; and adjusting the first high-frequency spectrum based on the second difference, to obtain the initial high-frequency spectrum.

Specifically, the high-frequency spectral envelope and the low-frequency spectral envelope may be represented by using spectral envelopes in a logarithmic domain. When the time-frequency transform is a Fourier transform, the initial high-frequency amplitude spectrum may be adjusted based on the determined first difference between the spectral envelopes in the logarithmic domain, to obtain a target high-frequency amplitude spectrum. When the time-frequency transform is a discrete cosine transform, the first high-frequency spectrum may be adjusted based on the determined second difference between the spectral envelopes in the logarithmic domain, to obtain an initial high-frequency spectrum. The high-frequency spectral envelope and the low-frequency spectral envelope may be represented by using the spectral envelopes in the logarithmic domain, to facilitate calculation.

When the time-frequency transform is a discrete sine transform, a wavelet transform, or the like, for a process of determining the target high-frequency amplitude spectrum, reference may be made to the generation process of the target high-frequency amplitude spectrum in the foregoing Fourier transform according to requirements. Certainly, for a process of determining the initial high-frequency spectrum, reference may alternatively be made to the generation process of the initial high-frequency spectrum in the foregoing discrete cosine transform according to requirements. Details are not described herein again.

In the solution of this embodiment, when the initial low-frequency spectrum is obtained through a Fourier transform, the high-frequency spectral envelope includes a second quantity of first sub-spectral envelopes, and the initial high-frequency amplitude spectrum includes a second quantity of first amplitude sub-spectra, each first sub-spectral envelope is determined based on a corresponding first amplitude sub-spectrum in the initial high-frequency amplitude spectrum. When the initial low-frequency spectrum is obtained through a discrete cosine transform, the high-frequency spectral envelope includes a third quantity of second sub-spectral envelopes, and the first high-frequency spectrum includes a third quantity of first sub-spectra, each second sub-spectral envelope is determined based on a corresponding first sub-spectrum in the first high-frequency spectrum.

Specifically, (1) when the time-frequency transform is a Fourier transform, a sub-spectral envelope is determined based on a corresponding amplitude sub-spectrum in a corresponding amplitude spectrum, and a first sub-spectral envelope may be determined based on a corresponding amplitude sub-spectrum in a corresponding initial high-frequency amplitude spectrum. A quantity of spectrum coefficients corresponding to each amplitude sub-spectrum may be the same or different. If each first sub-spectral envelope is determined based on a corresponding amplitude sub-spectrum in a corresponding amplitude spectrum, a quantity of spectrum coefficients of an amplitude sub-spectrum in the amplitude spectrum corresponding to each first sub-spectral envelope may also be different. (2) When the time-frequency transform is a discrete cosine transform, a sub-spectral envelope is determined based on a corresponding sub-spectrum in a corresponding spectrum, and a second sub-spectral envelope may be determined based on a corresponding sub-spectrum in a corresponding first high-frequency spectrum.

When the time-frequency transform is a discrete sine transform, a wavelet transform, or the like, reference may alternatively be made to the determining manner of the sub-spectral envelope in the foregoing Fourier transform according to requirements, to obtain a sub-spectral envelope. Certainly, reference may alternatively be made to the determining manner of the sub-spectral envelope in the foregoing discrete cosine transform according to requirements, to obtain a sub-spectral envelope. Details are not described herein again.

Descriptions are continued by using the foregoing scenario as an example. If the time-frequency transform is a Fourier transform, an output of the neural network model is a 14-dimensional high-frequency spectral envelope (the second quantity is 14), and input of the neural network model includes a low-frequency amplitude spectrum and a low-frequency spectral envelope, where if the low-frequency amplitude spectrum includes a 70-dimensional low-frequency domain coefficient, and the low-frequency spectral envelope includes a 14-dimensional sub-spectral envelope, an input of the neural network model is 84-dimensional data. An output dimension is far less than an input dimension, which can reduce a volume and a depth of the neural network model, and reduce complexity of the model. If the time-frequency transform is a discrete cosine transform, an input and an output of the neural network model are similar to those of the neural network model in the foregoing Fourier transform. Details are not described herein again.

Further, if the time-frequency transform is a Fourier transform, the determining a first difference between the high-frequency spectral envelope and the low-frequency spectral envelope, and adjusting the initial high-frequency amplitude spectrum based on the first difference, to obtain the target high-frequency amplitude spectrum, may include:

determining a first difference between each first sub-spectral envelope and a corresponding spectral envelope in the low-frequency spectral envelope (the corresponding spectral envelope in the low-frequency spectral envelope is recorded as a third sub-spectral envelope below);

adjusting a corresponding first amplitude sub-spectrum based on the first difference corresponding to each first sub-spectral envelope, to obtain a second quantity of adjusted first amplitude sub-spectra; and obtaining a target high-frequency amplitude spectrum based on the second quantity of adjusted first amplitude sub-spectra.

Further, if the time-frequency transform is a discrete cosine transform, the determining a second difference between the high-frequency spectral envelope and the low-frequency spectral envelope; and adjusting the first high-frequency spectrum based on the second difference, to obtain the initial high-frequency spectrum includes:

determining a second difference between each second sub-spectral envelope and a corresponding spectral envelope in the low-frequency spectral envelope (the corresponding spectral envelope in the low-frequency spectral envelope is recorded as a fourth sub-spectral envelope below);

adjusting a corresponding first sub-spectrum based on the second difference corresponding to each second sub-spectral envelope, to obtain a third quantity of adjusted first sub-spectra; and obtaining an initial high-frequency spectrum based on the third quantity of adjusted first sub-spectra.

Specifically, when the time-frequency transform is a Fourier transform, the high-frequency spectral envelope obtained by using the neural network model may include a second quantity of first sub-spectral envelopes. It can be learned from the foregoing description that the second quantity of first sub-spectral envelopes are determined based on corresponding amplitude sub-spectra in the low-frequency amplitude spectrum. That is, one sub-spectral envelope is determined based on one corresponding amplitude sub-spectrum in the low-frequency amplitude spectrum. Descriptions are continued by using the foregoing scenario as an example. If there are 14 amplitude sub-spectra in the low-frequency amplitude spectrum, then the high-frequency spectral envelope includes 14 sub-spectral envelopes.

The first difference between the high-frequency spectral envelope and the low-frequency spectral envelope is a difference between each first sub-spectral envelope and a corresponding third sub-spectral envelope, and adjusting the high-frequency spectral envelope based on the first difference is adjusting a corresponding first amplitude sub-spectrum based on the first difference between each first sub-spectral envelope and the corresponding third sub-spectral envelope. Descriptions are continued by using the foregoing scenario as an example. If the high-frequency spectral envelope includes 14 first sub-spectral envelopes, and the low-frequency spectral envelope includes 14 second sub-spectral envelopes, 14 first differences may be determined based on the 14 determined second sub-spectral envelopes and 14 corresponding first sub-spectral envelopes, and first amplitude sub-spectra corresponding to corresponding sub-bands are adjusted based on the 14 first differences.

Specifically, when the time-frequency transform is a discrete cosine transform, the high-frequency spectral envelope obtained by using the neural network model may include a third quantity of second sub-spectral envelopes, and the second difference between the high-frequency spectral envelope and the low-frequency spectral envelope is a difference between each second sub-spectral envelope and a corresponding fourth sub-spectral envelope. A process of adjusting the high-frequency spectral envelope based on the second difference is similar to the process of adjusting the high-frequency spectral envelope based on the first difference when the time-frequency transform is a Fourier transform. Details are not described herein again.

When the time-frequency transform is a discrete sine transform, a wavelet transform, or the like, reference may be made to the adjustment process of the high-frequency spectral envelope in the foregoing Fourier transform according to requirements, to adjust a corresponding high-frequency spectral envelope. Certainly, reference may alternatively be made to the adjustment process of the high-frequency spectral envelope in the foregoing discrete cosine transform according to requirements, to adjust a corresponding high-frequency spectral envelope. Details are not described herein again.

In the solution of this embodiment, the correlation parameter further includes relative flatness information, the relative flatness information representing a correlation between a spectral flatness of the high-frequency portion of the target broadband spectrum and a spectral flatness of the low-frequency portion of the target broadband spectrum.

The adjusting the high-frequency spectrum information based on the high-frequency spectral envelope and the low-frequency spectral envelope may include:

determining a gain adjustment value of the high-frequency spectral envelope based on the relative flatness information and energy information of the initial low-frequency spectrum;

adjusting the high-frequency spectral envelope based on the gain adjustment value, to obtain an adjusted high-frequency spectral envelope; and adjusting the high-frequency spectrum information based on the adjusted high-frequency spectral envelope and the low-frequency spectral envelope, the high-frequency spectrum information including the initial high-frequency amplitude spectrum or the first high-frequency spectrum.

Specifically, based on the foregoing descriptions, in the process of adjusting the high-frequency spectrum information based on the adjusted high-frequency spectral envelope and the low-frequency spectral envelope, a first difference or a second difference between the adjusted high-frequency spectral envelope and the low-frequency spectral envelope may be determined, and then the initial high-frequency amplitude spectrum is adjusted according to the first difference to obtain the target high-frequency amplitude spectrum, or the first high-frequency spectrum is adjusted according to the second difference to obtain the initial high-frequency spectrum.

Specifically, based on the foregoing descriptions, during training of the neural network model, an annotation result may include relative flatness information. That is, a sample label of sample data includes relative flatness information of a high-frequency portion and a low-frequency portion of a sample broadband signal, the relative flatness information being determined based on the high-frequency portion and the low-frequency portion of a spectrum of the sample broadband signal. Therefore, during application of the neural network model, when an input of the model is a low-frequency spectrum of a narrowband signal, relative flatness information of a high-frequency portion and a low-frequency portion of a target broadband spectrum may be predicted based on an output of the neural network model. The relative flatness information may reflect a relative spectral flatness between the high-frequency portion and the low-frequency portion of the target broadband spectrum, that is, whether a spectrum of the high-frequency portion is flat relative to that of the low-frequency portion. If a correlation parameter further includes the relative flatness information, a high-frequency spectral envelope may first be adjusted based on the relative flatness information and energy information of a low-frequency spectrum, and then the target broadband spectrum is adjusted based on a difference between an adjusted high-frequency spectral envelope and a low-frequency spectral envelope, to reduce harmonic waves in a finally obtained broadband signal. The energy information of the low-frequency spectrum may be determined based on spectrum coefficients of a low-frequency amplitude spectrum, and the energy information of the low-frequency spectrum may represent a spectral flatness.

In this embodiment, the correlation parameter may include the high-frequency spectral envelope and the relative flatness information. The neural network model includes at least an input layer and an output layer, a feature vector (the feature vector includes a 70-dimensional low-frequency amplitude spectrum and a 14-dimensional low-frequency spectral envelope) of low-frequency spectrum parameters is inputted into the input layer, and the output layer includes at least a unilateral LSTM layer and two fully connected network layers that are respectively connected to the LSTM layer. Each fully connected network layer may include at least one fully connected layer, where the LSTM layer transforms a feature vector processed by the input layer. One fully connected network layer performs first classification according to a vector value transformed by the LSTM layer and outputs the high-frequency spectral envelope (14-dimensional), and another fully connected network layer performs second classification according to the vector value transformed by the LSTM layer and outputs the relative flatness information (4-dimensional).

Figure 2:
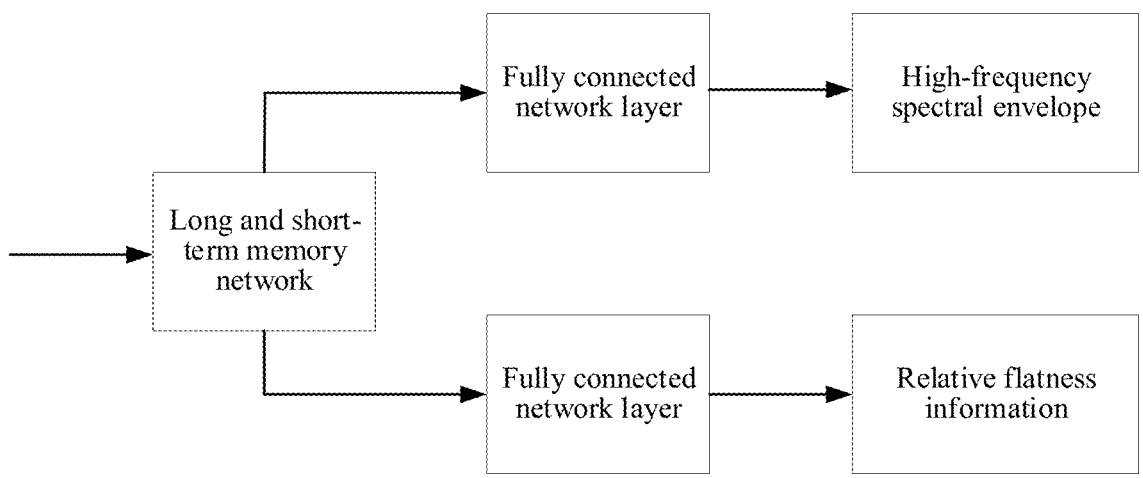
FIG. 2 is a schematic diagram of a network structure of a neural network model according to an embodiment of this application.

In an example, FIG. 2 is a schematic structural diagram of a neural network model according to an embodiment of this application. As shown in the figure, the neural network model may mainly include two parts: a unilateral LSTM layer and two fully connected layers. That is, each fully connected network layer in the example includes one fully connected layer. An output of one fully connected layer is the high-frequency spectral envelope, and an output of another fully connected layer is the relative flatness information.

The LSTM layer is a recurrent neural network, and an input of the LSTM layer is the feature vector (which may be referred to as an input vector for short) of the low-frequency spectrum parameters. The LSTM layer processes the input vector, to obtain a latent vector with a specific dimensionality. The latent vector is separately used as inputs of the two fully connected layers, and the two fully connected layers separately perform classification prediction processing. One fully connected layer predicts and outputs a 14-dimensional column vector, and the output is correspondingly the high-frequency spectral envelope. An other fully connected layer predicts and outputs a 4-dimensional column vector, and values in four dimensions of the vector are four probability values described above. The four probability values respectively represent probabilities that the relative flatness information is the foregoing four arrays.

In an example, when the time-frequency transform is a Fourier transform (for example, an STFT), a feature vector, that is, a 70-dimensional low-frequency amplitude spectrum $P_{Low}(i, j)$ of a narrowband signal, may be first obtained according to a filtered 70-dimensional low-frequency spectrum $S_{Low\_rev}(i, j)$, then $P_{Low}(i, j)$ is used as an input of the neural network model, and simultaneously a feature vector, that is, a 14-dimensional low-frequency spectral envelope $e_{Low}(i, k)$ calculated according to $P_{Low}(i, j)$, is used as another input of the neural network model. That is, the input layer of the neural network model is an 84-dimensional feature vector. The neural network model transforms the 84-dimensional feature vector by using the LSTM layer (for example, including 256 parameters), to obtain a transformed vector value; performs classification (that is, first classification) on the transformed vector value by using one fully connected network layer (for example, including 512 parameters) connected to the LSTM layer, and outputs a 14-dimensional high-frequency spectral envelope $e_{High}(i, k)$; and simultaneously performs classification (that is, second classification) on the transformed vector value by using an other fully connected network layer (for example, including 512 parameters) connected to the LSTM layer, and outputs four pieces of relative flatness information.

In another example, when the time-frequency transform is a discrete cosine transform (for example, an MDCT), a feature vector, that is, a filtered 70-dimensional low-frequency spectrum $S_{Low\_rev}(i, j)$ may be used as an input of the neural network model, and simultaneously, a feature vector, that is, a 14-dimensional low-frequency spectral envelope $e_{Low}(i, k)$ obtained according to $S_{Low\_rev}(i, j)$ is used as another input of the neural network model. That is, the input layer of the neural network model is an 84-dimensional feature vector. The neural network model transforms the 84-dimensional feature vector by using the LSTM layer (for example, including 256 parameters), to obtain a transformed vector value; performs classification (that is, first classification) on the transformed vector value by using one fully connected network layer (for example, including 512 parameters) connected to the LSTM layer, and outputs a 14-dimensional high-frequency spectral envelope $e_{High}(i, k)$; and simultaneously performs classification (that is, second classification) on the transformed vector value by using an other fully connected network layer (for example, including 512 parameters) connected to the LSTM layer, and outputs four pieces of relative flatness information.

In the solution of this embodiment, the relative flatness information includes relative flatness information corresponding to at least two subband regions of the high-frequency portion, relative flatness information corresponding to one subband region representing a correlation between a spectral flatness of the subband region of the high-frequency portion and a spectral flatness of a high-frequency band of the low-frequency portion.

The relative flatness information is determined based on the high-frequency portion and the low-frequency portion of the spectrum of the sample broadband signal. Because harmonic waves included in a low-frequency band of the low-frequency portion of the sample narrowband signal are richer, a high-frequency band in the low-frequency portion of the sample narrowband signal may be selected as a reference for determining the relative flatness information. The high-frequency band of the low-frequency portion is used as a master, and the high-frequency portion of the sample broadband signal is classified into at least two subband regions. Relative flatness information of each subband region is determined based on a spectrum of the corresponding subband region and a spectrum of the low-frequency portion.

Based on the foregoing descriptions, during training of the neural network model, an annotation result may include relative flatness information of each subband region. That is, a sample label of sample data may include relative flatness information of each subband region of a high-frequency portion and a low-frequency portion of a sample broadband signal, the relative flatness information being determined based on a spectrum of a subband region of the high-frequency portion and a spectrum of the low-frequency portion of the sample broadband signal. Therefore, during application of the neural network model, when an input of the model is a low-frequency spectrum of a narrowband signal, relative flatness information of a subband region of a high-frequency portion and a low-frequency portion of a target broadband spectrum may be predicted based on an output of the neural network model.

Specifically, when the high-frequency portion includes spectrum parameters corresponding to the at least two subband regions, a spectrum parameter of each subband region is determined based on a spectrum parameter of the high-frequency band of the low-frequency portion. Correspondingly, the relative flatness information may include relative flatness information between the spectrum parameter of each subband region and the spectrum parameter of the high-frequency band of the low-frequency portion, where the spectrum parameter is the amplitude spectrum or the spectrum. When the time-frequency transform is a Fourier transform, the spectrum parameter is the amplitude spectrum; and when the time-frequency transform is a discrete cosine transform, the spectrum parameter is the spectrum.

To achieve the objective of BWE, a quantity of spectrum parameters of an amplitude spectrum of the low-frequency portion of the target broadband spectrum may be the same or different from a quantity of spectrum coefficients of an amplitude spectrum of the high-frequency portion of the target broadband spectrum; and a quantity of spectrum coefficients corresponding to each subband region may be the same or different, provided that a total quantity of spectrum coefficients corresponding to at least two subband regions is consistent with a quantity of spectrum coefficients corresponding to the initial high-frequency amplitude spectrum.

In an example, when the time-frequency transform is a Fourier transform, for example, the at least two corresponding subband regions included in the high-frequency portion are two subband regions, which are respectively a first subband region and a second subband region; the high-frequency band of the low-frequency portion is a band corresponding to the $35^{th}$ frequency point to the $69^{th}$ frequency point; a quantity of spectrum coefficients corresponding to the first subband region is the same as a quantity of spectrum coefficients corresponding to the second subband region; and a total quantity of spectrum coefficients corresponding to the first subband region and the second subband region is the same as a quantity of spectrum coefficients corresponding to the low-frequency portion. Therefore, a band corresponding to the first subband region is a band corresponding to the 70$^{th}$ frequency point to the 104$^{th}$ frequency point; a band corresponding to the second subband region is a band corresponding to the 105$^{th}$ frequency point to the 139$^{th}$ frequency point; and a quantity of spectrum coefficients of an amplitude spectrum of each subband region is 35, which is the same as a quantity of spectrum coefficients of an amplitude spectrum of the high-frequency band of the low-frequency portion. If a selected high-frequency band of the low-frequency portion is a band corresponding to the 56$^{th}$ frequency point to the 69$^{th}$ frequency point, the high-frequency portion may be classified into five subband regions, and each subband region corresponds to 14 spectrum coefficients. When the time-frequency transform is a discrete cosine transform, a case in which the high-frequency portion includes a spectrum corresponding to at least two subband regions is similar to a case in this example in which the time-frequency transform is a Fourier transform, and the high-frequency portion includes an amplitude spectrum corresponding to at least two subband regions. Details are not described herein again.

Specifically, regardless of whether the time-frequency transform is a Fourier transform or a discrete cosine transform, the determining a gain adjustment value of the high-frequency spectral envelope based on the relative flatness information and energy information of the initial low-frequency spectrum may include:

determining a gain adjustment value of a corresponding spectral envelope part in the high-frequency spectral envelope based on relative flatness information corresponding to each subband region and spectrum power information corresponding to each subband region in the initial low-frequency spectrum.

The adjusting the high-frequency spectral envelope based on the gain adjustment value may include:

adjusting each corresponding spectral envelope part according to a gain adjustment value of the corresponding spectral envelope part in the high-frequency spectral envelope.

Specifically, if the high-frequency portion includes at least two subband regions, a gain adjustment value of a corresponding spectral envelope part in the high-frequency spectral envelope corresponding to each subband region may be determined based on relative flatness information corresponding to each subband region and spectrum power information corresponding to each subband region in the initial low-frequency spectrum; and then the corresponding spectral envelope part is adjusted according to the determined gain adjustment value.

In an example, when the time-frequency transform described above is a Fourier transform, the at least two subband regions are two subband regions, which are respectively a first subband region and a second subband region. Relative flatness information of the first subband region and the high-frequency band of the low-frequency portion is first relative flatness information; and relative flatness information of the second subband region and high-frequency band of the low-frequency portion is second relative flatness information. An envelope part of a high-frequency spectral envelope corresponding to the first subband region may be adjusted based on a gain adjustment value determined based on the first relative flatness information and spectrum power information corresponding to the first subband region; and an envelope part of a high-frequency spectral envelope corresponding to the second subband region may be adjusted based on a gain adjustment value determined based on the second relative flatness information and spectrum power information corresponding to the second subband region. When the time-frequency transform is a discrete cosine transform, a process of determining the relative flatness information and the gain adjustment value is similar to the process of determining the relative flatness information and the gain adjustment value when the time-frequency transform is a Fourier transform in this example. Details are not described herein again.

In the solution of this embodiment, because harmonic waves included in a low-frequency band of the low-frequency portion of the sample narrowband signal are richer, a high-frequency band in the low-frequency portion of the sample narrowband signal may be selected as a reference for determining the relative flatness information. The high-frequency band of the low-frequency portion is used as a master, and the high-frequency portion of the sample broadband signal is classified into at least two subband regions. Relative flatness information of each subband region is determined based on a spectrum of each subband region of the high-frequency portion and a spectrum of the low-frequency portion.

Based on the foregoing descriptions, in a training stage of the neural network model, relative flatness information of each subband region in a high-frequency portion of a spectrum of a sample broadband signal may be determined based on sample data (the sample data includes a sample narrowband signal and a corresponding sample broadband signal) by using a variance analysis method. In an example, if a high-frequency portion of a sample broadband signal is classified into two subband regions, which are respectively a first subband region and a second subband region, relative flatness information of a high-frequency portion and a low-frequency portion of the sample broadband signal may be first relative flatness information of the first subband region and a high-frequency band of the low-frequency portion of the sample broadband signal and second relative flatness information of the second subband region and the high-frequency band of the low-frequency portion of the sample broadband signal.

A process of determining the first relative flatness information and the second relative flatness information is described below by using a case in which the time-frequency transform is a Fourier transform as an example.

A specific determining manner of the first relative flatness information and the second relative flatness information may be:

calculating the following three variances based on a frequency domain coefficient $S_{Low,sample}(i, j)$ of the narrowband signal in the sample data and a frequency domain coefficient $S_{High,sample}(i, j)$ of the high-frequency portion of the broadband signal in the sample data by using Formula (4) to Formula (6):

$$\text{var}_L(S_{Low,sample}(i,j)), j=35,36,\ldots,69 \qquad (4)$$

$$\text{var}_{H1}(S_{High,sample}(i,j)), j=70,71,\ldots,104 \qquad (5)$$

$$\text{var}_{H2}(S_{High,sample}(i,j)), j=105,106,\ldots,139 \qquad (6)$$

where Formula (4) is a variance of an amplitude spectrum of the high-frequency band of the low-frequency portion of the sample narrowband signal; Formula (5) is a variance of an amplitude spectrum of the first subband region; Formula (6) is a variance of an amplitude spectrum of the second subband region; var( ) represents variance calculation, and variance of a spectrum may be represented based on corresponding frequency domain coefficients; and $S_{Low,sample}(i,j)$ represents a frequency domain coefficient of the sample narrowband signal.

Relative flatness information of an amplitude spectrum of each subband region and the amplitude spectrum of the high-frequency band of the low-frequency portion are determined based on the foregoing three variances by using Formula (7) and Formula (8).

$$fc(0) = \log\left(\frac{var_L}{var_{H1}}\right) \quad (7)$$

$$fc(1) = \log\left(\frac{var_L}{var_{H2}}\right) \quad (8)$$

where $fc(0)$ represents first relative flatness information of the amplitude spectrum of the first subband region and the amplitude spectrum of the high-frequency band of the low-frequency portion, and $fc(1)$ represents second relative flatness information of the amplitude spectrum of the second subband region and the amplitude spectrum of the high-frequency band of the low-frequency portion.

The two values $fc(0)$ and $fc(1)$ may be classified depending on whether the two values are greater than or equal to 0, and $fc(0)$ and $fc(1)$ are defined as a binary classification array, so that the array includes four permutations and combinations: {0,0}, {0,1}, {1,0}, {1,1}.

In this way, relative flatness information outputted by the model may be four probability values, the probability values being used for identifying probabilities that the relative flatness information belongs to the four arrays.

Based on the principle of maximum probability, one of the four permutations and combinations of the array may be selected as predicted relative flatness information of amplitude spectra of extended regions of the two subband regions and an amplitude spectrum of the high-frequency band of the low-frequency portion. Specifically, the relative flatness information may be represented by using Formula (9):

$$v(i,k)=0 \text{ or } 1, k=0,1 \quad (9)$$

where $v(i, k)$ represents the relative flatness information of the amplitude spectra of the extended regions of the two subband regions and the amplitude spectrum of the high-frequency band of the low-frequency portion, and k represents an index of a different subband region, so that each subband region can correspond to one piece of relative flatness information. For example, when k=0, $v(i, k)$=0 represents that the first subband region is more oscillatory than the low-frequency portion, that is, have a poorer flatness; and $v(i, k)$=1 represents that the first subband region is flatter than the low-frequency portion, that is, have a better flatness.

In this embodiment, a low-frequency spectrum of a second narrowband signal is inputted into a trained neural network model, and relative flatness information of a high-frequency portion of a target broadband spectrum may be predicted by using the neural network model. If a spectrum corresponding to a high-frequency band of a low-frequency portion of the narrowband signal is used as an input of the neural network model, relative flatness information of at least two subband regions of the high-frequency portion of the target broadband spectrum can be predicted based on the trained neural network model.

In the solution of this embodiment, the high-frequency spectral envelope includes a first predetermined quantity of high-frequency sub-spectral envelopes; when the initial low-frequency spectrum is obtained through a Fourier transform, the first predetermined quantity is the foregoing second quantity; and when the initial low-frequency spectrum is obtained through a discrete cosine transform, the first predetermined quantity is the third quantity.

The determining a gain adjustment value of a corresponding spectral envelope part in the high-frequency spectral envelope based on relative flatness information corresponding to each subband region and spectrum power information corresponding to each subband region in the initial low-frequency spectrum includes:

determining, for each high-frequency sub-spectral envelope, a gain adjustment value of each high-frequency sub-spectral envelope according to spectrum power information corresponding to a spectral envelope in the low-frequency spectral envelope corresponding to each high-frequency sub-spectral envelope, relative flatness information corresponding to a subband region corresponding to the spectral envelope in the low-frequency spectral envelope corresponding to each high-frequency sub-spectral envelope, and spectrum power information corresponding to the subband region corresponding to the spectral envelope in the low-frequency spectral envelope corresponding to each high-frequency sub-spectral envelope.

The adjusting each corresponding spectral envelope part according to a gain adjustment value of the corresponding spectral envelope part in the high-frequency spectral envelope includes:

adjusting each high-frequency sub-spectral envelope according to a gain adjustment value of the corresponding high-frequency sub-spectral envelope in the high-frequency spectral envelope.

Specifically, detailed descriptions are made below by using an example in which the initial low-frequency spectrum is obtained through a Fourier transform, and the first predetermined quantity is the second quantity.

Specifically, each high-frequency sub-spectral envelope of the high-frequency spectral envelope corresponds to one gain adjustment value. The gain adjustment value is determined based on spectrum power information corresponding to a low-frequency sub-spectral envelope, relative flatness information corresponding to a subband region corresponding to the low-frequency sub-spectral envelope, and spectrum power information corresponding to the subband region corresponding to the low-frequency sub-spectral envelope. In addition, the low-frequency sub-spectral envelope corresponds to the high-frequency sub-spectral envelope, and the high-frequency spectral envelope includes a second quantity of high-frequency sub-spectral envelopes, so that the high-frequency spectral envelope includes a second quantity of corresponding gain adjustment values.

It may be understood that if the high-frequency portion corresponds to at least two subband regions, for the high-frequency spectral envelope corresponding to the at least two subband regions, a first sub-spectral envelope of each subband region may be adjusted based on a gain adjustment value corresponding to the first sub-spectral envelope corresponding to the corresponding subband region.

An example in which the first subband region includes 35 frequency points is used below. One embodiment of determining a gain adjustment value of a first sub-spectral envelope corresponding to a second sub-spectral envelope based on spectrum power information corresponding to the second sub-spectral envelope, relative flatness information corresponding to a subband region corresponding to the second sub-spectral envelope, and spectrum power information corresponding to the subband region corresponding to the second sub-spectral envelope is as follows:

(1) parsing v(i, k), where if v(i, k) is 1, it indicates that the high-frequency portion is very flat, and if v(i, k) is 0, it indicates that the high-frequency portion is oscillatory;

(2) dividing 35 frequency points in the first subband region seven subbands, each subband corresponding to one first sub-spectral envelope; separately calculating average energy pow_env (the spectrum power information corresponding to the second sub-spectral envelope) of each subband, and calculating an average value Mpow_env (the spectrum power information corresponding to the subband region corresponding to the second sub-spectral envelope) of average energy of the seven subbands, where the average energy of each subband is determined based on a corresponding low-frequency amplitude spectrum, for example, a square of an absolute value of a spectrum coefficient of each low-frequency amplitude spectrum is used as energy of the low-frequency amplitude spectrum, and one subband corresponds to spectrum coefficients of five low-frequency amplitude spectra, so that an average value of energy of low-frequency amplitude spectra corresponding to a subband can be used as average energy of the subband; and (3) calculating a gain adjustment value of each first sub-spectral envelope based on parsed relative flatness information corresponding to the first subband region, the average energy pow_env, and the average value Mpow_env, specifically including:

when $v(i,k)=1, G(j)=a_1+b_1*\text{SQRT}(M\text{pow\_env/pow\_env}(j)), j=0,1,\ldots,6$;

when $v(i,k)=0, G(j)=a_0+b_0*\text{SQRT}(M\text{pow\_env/pow\_env}(j)), j=0,1,\ldots,6$;

where in a solution, $a_1=0.875$, $b_1=0.125$, $a_0=0.925$, $b_0=0.075$, and $G(j)$ is the gain adjustment value.

For a case that v(i, k)=0, the gain adjustment value is 1, that is, no flattening operation (adjustment) needs to be performed on the high-frequency spectral envelope.

Based on the foregoing manner, gain adjustment values of the seven first sub-spectral envelopes in the high-frequency spectral envelope can be determined, and the corresponding first sub-spectral envelopes are adjusted based on the gain adjustment values of the seven first sub-spectral envelopes. The operation can reduce the average energy difference of different subbands, and perform different degrees of flattening processing on the spectrum corresponding to the first subband region.

It may be understood that the high-frequency spectral envelope corresponding to the second subband region may be adjusted in a manner the same as the above. Details are not described herein again. The high-frequency spectral envelopes include 14 frequency subbands in total, so that 14 gain adjustment values can be correspondingly determined, and corresponding sub-spectral envelopes are adjusted based on the 14 gain adjustment values.

In the solution of this embodiment, the broadband signal includes a signal of the low-frequency portion in the narrowband signal and a signal of a high-frequency portion after extension, so that after the initial low-frequency spectrum corresponding to the low-frequency portion and the initial high-frequency spectrum corresponding to the high-frequency portion are obtained, the initial low-frequency spectrum and the initial high-frequency spectrum may be combined, to obtain a broadband spectrum; and then a frequency-time transform (an inverse transform of a time-frequency transform, to transform a frequency-domain signal into a time-domain signal) is performed on the broadband spectrum, so that a target speech signal after BWE can be obtained.

Specifically, before the initial low-frequency spectrum and the initial high-frequency spectrum are combined, at least one of the initial low-frequency spectrum and the initial high-frequency spectrum may first be filtered, and then a broadband signal after BWE is obtained based on a filtered spectrum. In other words, only the initial low-frequency spectrum may be filtered, to obtain a filtered initial low-frequency spectrum (which is recorded as a target low-frequency spectrum), and then the target low-frequency spectrum and the initial high-frequency spectrum are combined; or only the initial high-frequency spectrum may be filtered, to obtain a filtered initial high-frequency spectrum (which is recorded as a target high-frequency spectrum), and then the initial low-frequency spectrum and the target high-frequency spectrum are combined; or the initial low-frequency spectrum and the initial high-frequency spectrum may be respectively filtered, to obtain a corresponding target low-frequency spectrum and a corresponding target high-frequency spectrum, and then the target low-frequency spectrum and the target high-frequency spectrum are combined.

Specifically, a filtering process of the initial low-frequency spectrum and a filtering process of the initial high-frequency spectrum are basically consistent. A filtering process is described below in detail by using an example in which the initial low-frequency spectrum is filtered, which is shown as follows:

In the process of filtering the initial low-frequency spectrum, the following operations may be performed:

dividing the initial low-frequency spectrum into a first quantity of sub-spectra, and determining first spectrum power corresponding to each sub-spectrum;

determining a filter gain corresponding to each sub-spectrum based on the first spectrum power corresponding to each sub-spectrum; and respectively filtering the corresponding each sub-spectrum according to the filter gain corresponding to each sub-spectrum.

Specifically, the foregoing process of filtering the initial low-frequency spectrum may alternatively be: first determining a filter gain (recorded as a first filter gain below) of the initial low-frequency spectrum based on spectrum power of the initial low-frequency spectrum, and then filtering the initial low-frequency spectrum according to the first filter gain to obtain a low-frequency spectrum, the first filter gain including a filter gain (recorded as a second filter gain below) corresponding to each sub-spectrum. In an actual application, because the initial low-frequency spectrum is usually represented by using initial low-frequency domain coefficients, and the low-frequency spectrum is represented by using low-frequency domain coefficients, a process of filtering the initial low-frequency spectrum according to the first filter gain may be described as: first determining the first filter gain based on the initial low-frequency domain coefficients, and then filtering the initial low-frequency domain coefficients according to the first filter gain, to obtain the low-frequency domain coefficients.

Specifically, a multiplication operation may be performed on the first filter gain and the initial low-frequency domain coefficients to filter the initial low-frequency domain coefficients, to obtain the low-frequency domain coefficients. The initial low-frequency domain coefficient is $S_{Low}(i, j)$, and the low-frequency domain coefficient is $S_{Low\_rev}(i, j)$. Assuming that the determined first filter gain is $G_{Low\_post\_fil}(j)$, then the initial low-frequency domain coefficients may be filtered according to Formula (10):

$$S_{Low\_rev}(i,j) = G_{Low\_post\_fil}(i) * S_{Low}(i,j) \tag{10}$$

where i is a frame index of a speech frame, and j is an intra-frame sample index (j=0, 1, . . . , 69).

Specifically, in the process of determining the first filter gain based on the initial low-frequency domain coefficients, the initial low-frequency domain coefficients are first divided into a first quantity sub-spectra, first spectrum power corresponding to each sub-spectrum is determined, and then a second filter gain corresponding each sub-spectrum is determined based on the first spectrum power corresponding to each sub-spectrum, the first filter gain including the first quantity of second filter gains; and when the initial spectrum is filtered according to the first filter gain, each sub-spectrum may be filtered according to the second filter gain corresponding to each corresponding sub-spectrum.

For ease of description, the first quantity is recorded as L. One embodiment of dividing the initial low-frequency domain coefficients into L sub-spectra is: performing band division on the initial low-frequency domain coefficients, to obtain a first quantity of sub-spectra, each subband corresponding to N initial low-frequency domain coefficients, and N*L being equal to a total quantity of the initial low-frequency domain coefficients, L≥2, and N≥1. In an example, there are 70 initial low-frequency domain coefficients, so that a band corresponding to every five (N=5) initial low-frequency domain coefficients may be divided into one subband, and a total of 14 (L=14) subbands are obtained through division, each subband corresponding to five initial low-frequency domain coefficients.

One embodiment of determining the first spectrum power corresponding to each sub-spectrum is: determining a sum of spectrum power of the N initial low-frequency domain coefficients corresponding to each sub-spectrum as the first spectrum power corresponding to each sub-spectrum. Spectrum power of each initial low-frequency domain coefficient is defined as a sum of a square of a real part and a square of an imaginary part of each initial low-frequency domain coefficient. In an example, there are 70 spectrum coefficients in the initial low-frequency domain coefficients, N=5, and L=14, so that the first spectrum power corresponding to each sub-spectrum may be calculated by using Formula (11):

$$Pe(k) = \sum_{j=0}^{4} (\text{Real }(S_{Low}(i, k*5 + j)))^2 + (Imag(S_{Low}(i, k*5 + j)))^2 \tag{11}$$

where i is a frame index of a speech frame; j is an intra-frame sample index (j=0, 1, . . . , 69); k=0, 1, . . . , 13, and k is an index number of a subband, which indicates 14 subbands; Pe(k) represents the first spectrum power corresponding to the $k^{th}$ sub-spectrum; $S_{Low}(i, j)$ is a low-frequency domain coefficient (that is, an initial low-frequency domain coefficient) obtained according to a time-frequency transform; and Real and Imag are respectively a real part and an imaginary part.

Specifically, after the first spectrum power corresponding to each sub-spectrum is obtained, a second filter gain corresponding to each sub-spectrum may be determined based on the first spectrum power corresponding to each sub-spectrum. In a process of determining the second filter gain corresponding each sub-spectrum, a band corresponding to the initial spectrum may be first divided into a first subband and a second subband; then first subband power of the first subband is determined according to first spectrum power of all sub-spectra that correspond to the first subband, and second subband power of the second subband is determined according to first spectrum power of all sub-spectra that correspond to the second subband; then a spectral tilt coefficient of the initial spectrum is determined according to the first subband power and the second subband power; and then the second filter gain corresponding to each sub-spectrum is determined according to the spectral tilt coefficient and the first spectrum power corresponding to each sub-spectrum.

The frequency band corresponding to the initial spectrum is a sum of frequency bands respectively corresponding to the initial low-frequency domain coefficients (for example, 70 initial low-frequency domain coefficients), and in a process of dividing the frequency bands corresponding to the initial low-frequency domain coefficients into the first subband and the second subband, a sum of frequency bands respectively corresponding to the first initial low-frequency domain coefficient to the $35^{th}$ initial low-frequency domain coefficient may be used as the first subband, and a sum of frequency bands respectively corresponding to the $36^{th}$ initial low-frequency domain coefficient to the $70^{th}$ initial low-frequency domain coefficient may be used as the second subband. That is, the first subband corresponds to the first initial low-frequency domain coefficient to the $35^{th}$ initial low-frequency domain coefficient in the initial spectrum, and the second subband corresponds to the $36^{th}$ initial low-frequency domain coefficient to the $70^{th}$ initial low-frequency domain coefficient in the initial spectrum. Assuming that N=5, that is, every five initial low-frequency domain coefficients are divided into one sub-spectrum, then the first subband includes seven sub-spectra, and the second subband also includes seven sub-spectra. Therefore, the first subband power of the first subband may be determined according to a sum of first spectrum power of the seven sub-spectra included in the first subband, and the second subband power of the second subband may also be determined according to a sum of first spectrum power of the seven sub-spectra included in the second subband.

Specifically, when the narrowband signal is a speech signal of a current speech frame, for each sub-spectrum, in one embodiment, determining first spectrum power corresponding to each sub-spectrum includes: determining first initial spectrum power Pe(k) corresponding to each sub-spectrum according to Formula (11). If the current speech frame is a first speech frame, the first initial spectrum power Pe(k) of each sub-spectrum may be determined as the first spectrum power of each sub-spectrum, and the first spectrum power may be recorded as Fe(k), that is, Fe(k)=Pe(k). If the current speech frame is not the first speech frame, in a process of determining the first spectrum power of the $k^{th}$ sub-spectrum, second initial spectrum power of a sub-spectrum of an associated speech frame corresponding to the $k^{th}$ sub-spectrum may be obtained, and the second initial spectrum power is recorded as $Pe_{pre}(k)$. The associated speech frame is at least one speech frame previous to and adjacent to the current speech frame. After the second initial spectrum power is obtained, the first spectrum power of the sub-spectrum may be obtained based on the first initial spectrum power and the second initial spectrum power.

In an example, the first spectrum power of the $k^{th}$ sub-spectrum may be determined according to Formula (12):

$$Fe(k) = 1.0 + Pe(k) + Pe_{pre}(k) \tag{12}$$

where Pe(k) is the first initial spectrum power of the $k^{th}$ sub-spectrum, $Pe_{pre}(k)$ is second initial spectrum power of the sub-spectrum of the associated speech frame corresponding to the $k^{th}$ sub-spectrum, and Fe(k) is the first spectrum power of the $k^{th}$ sub-spectrum.

The associated speech frame in Formula (11) is a speech frame previous to and adjacent to the current speech frame. When the associated speech frame is two or more speech frames previous to and adjacent to the current speech frame, Formula (12) may be appropriately adjusted according to requirements. For example, when the associated speech frame is two speech frames previous to and adjacent to the current speech frame, Formula (12) may be correspondingly adjusted to: Fe(k)=1.0+Pe(k)+Pe$_{pre_1}$(k)+Pe$_{pre_2}$(k). Pe$_{pre_1}$(k) is first initial spectrum power of the first speech frame previous to and closely adjacent to the current speech frame, and Pe$_{pre_2}$(k) is first initial spectrum power of a speech frame previous to and closely adjacent to the first speech frame.

In another example, after the first spectrum power of the $k^{th}$ sub-spectrum is obtained according to the foregoing formula, the first spectrum power may be smoothed, and after smoothed first spectrum power Fe_sm(k) is determined, Fe_sm(k) may be determined as the first spectrum power of the $k^{th}$ sub-spectrum. The first spectrum power may be smoothed according to Formula (13):

$$Fe\_sm(k)=(Fe(k)+Fe_{pre}(k))/2 \qquad (13)$$

where Fe(k) is the first spectrum power of the $k^{th}$ sub-spectrum, Fe$_{pre}$(k) is the first spectrum power of the sub-spectrum of the associated speech frame corresponding to the $k^{th}$ sub-spectrum, and Fe_sm(k) is the smoothed first spectrum power. After the smoothed first spectrum power Fe_sm(k) is determined, Fe_sm(k) may be determined as the first spectrum power of the $k^{th}$ sub-spectrum.

The associated speech frame in Formula (13) is a speech frame previous to and adjacent to the current speech frame. When the associated speech frame is two or more speech frames previous to and adjacent to the current speech frame, Formula (13) may be appropriately adjusted according to requirements. For example, when the associated speech frame is two speech frames previous to and adjacent to the current speech frame, Formula (13) may be correspondingly adjusted to: Fe_sm(k)=(Fe(k)+Fe$_{pre1}$(k)+Fe$_{pre2}$(k))/3. Fe$_{pre1}$(k) is first spectrum power of the first speech frame previous to and closely adjacent to the current speech frame, and Pe$_{pre2}$(k) is first spectrum power of a speech frame previous to and closely adjacent to the first speech frame.

Specifically, after the first spectrum power Fe(k) or Fe_sm(k) of each sub-spectrum is determined according to the foregoing process, when the first spectrum power of each sub-spectrum is Fe(k), the first subband power of the first subband and the second subband power of the second subband may be determined according to Formula (14):

$$e1 = 1 + \sum_{k=0}^{6} Fe(k) \qquad (14)$$

$$e2 = 1 + \sum_{k=7}^{13} Fe(k)$$

where e1 is the first subband power of the first subband, and e2 is the second subband power of the second subband.

When the first spectrum power of each sub-spectrum is Fe_sm(k), the first subband power of the first subband and the second subband power of the second subband may be determined according to Formula (15):

$$e1 = 1 + \sum_{k=0}^{6} Fe\_sm(k) \qquad (15)$$

$$e2 = 1 + \sum_{k=7}^{13} Fe\_sm(k)$$

where e1 is the first subband power of the first subband, and e2 is the second subband power of the second subband.

Specifically, after the first subband power and the second subband power are determined, the spectral tilt coefficient of the initial spectrum may be determined according to the first subband power and the second subband power. In one embodiment, the spectral tilt coefficient of the initial spectrum may be determined according to the following logic:

When the second subband power is greater than or equal to the first subband power, the initial spectral tilt coefficient is determined to be 0; and when the second subband power is less than the first subband power, the initial spectral tilt coefficient may be determined according to the following expression:

$$T\_para\_0=8*f\_cont\_low*SQRT((e1-e2)/(e1+e2));$$

where T_para_0 is the initial spectral tilt coefficient; f_cont_low is a preset filter coefficient; and in a solution, f_cont_low=0.035, SQRT is a square root finding operation, e1 is the first subband power, and e2 is the second subband power.

Specifically, after the initial spectral tilt coefficient T_para_0 is obtained according to the foregoing manner, the initial spectrum coefficient may be used as a spectral tilt coefficient of the initial spectrum. Alternatively, the obtained initial spectral tilt coefficient may be further optimized in the following manner, and an optimized initial spectral tilt coefficient may be used as the spectral tilt coefficient of the initial spectrum. In an example, expressions of the optimization are:

$$T\_para\_1=min(1.0,T\_para\_0)$$

$$T\_para\_2=T\_para\_1/7$$

where min represents obtaining of a minimum value, T_para_1 is the initial spectral tilt coefficient after initial optimization, and T_para_2 is the initial spectral tilt coefficient after final optimization, that is, the foregoing spectral tilt coefficient of the initial spectrum.

Specifically, after the spectral tilt coefficient of the initial spectrum is determined, the second filter gain corresponding to each sub-spectrum may be determined according to the spectral tilt coefficient and the first spectrum power corresponding to each sub-spectrum. In an example, a second filter gain corresponding to the $k^{th}$ sub-spectrum may be determined according to Formula (16):

$$gain_{f0}(k)=Fe(k)^{f\_cont\_low} \qquad (16)$$

where gain$_{f0}$(k) is the second filter gain corresponding to the $k^{th}$ sub-spectrum, Fe(k) is the first spectrum power of the $k^{th}$ sub-spectrum, f_cont_low, is a preset filter coefficient; and in a solution, f_cont_low=0.035, k=0, 1, . . . , 13, and k is an index number of a subband, which indicates 14 subbands.

After the second filter gain gain$_{f0}$(k) corresponding to the $k^{th}$ sub-spectrum is determined, if the spectral tilt coefficient of the initial spectrum is not positive, gain$_{f0}$(k) may be directly used as the second filter gain of the $k^{th}$ sub-spectrum; and if the spectral tilt coefficient of the initial spectrum is positive, the second filter gain gain$_{f0}$(k) may be adjusted according to the spectral tilt coefficient of the initial spectrum, and an adjusted second filter gain $\text{gain}_{f0}(k)$ is used as the second filter gain corresponding to the $k^{th}$ sub-spectrum. In an example, the second filter gain $\text{gain}_{f0}(k)$ may be adjusted according to Formula (17):

$$\text{gain}_{f1}(k)=\text{gain}_{f0}(k)*(1+k*T_{para}) \quad (17)$$

where $\text{gain}_{f1}(k)$ is the adjusted second filter gain, $\text{gain}_{f0}(k)$ is the second filter gain corresponding to the $k^{th}$ sub-spectrum, $T_{para}$ is the spectral tilt coefficient of the initial spectrum, k=0, 1, . . . , 13, and K is an index number of a subband, which indicates 14 subbands.

Specifically, after the second filter gain $\text{gain}_{f1}(k)$ corresponding to the $k^{th}$ sub-spectrum is determined, $\text{gain}_{f1}(k)$ may be further optimized, and an optimized $\text{gain}_{f1}(k)$ is used as the final second filter gain corresponding to the $k^{th}$ sub-spectrum. In an example, the second filter gain $\text{gain}_{f1}(k)$ may be adjusted according to Formula (18):

$$\text{gain}_{Low\_post\_filt}(k)=(1+\text{gain}_{f1}(k))/2 \quad (18)$$

where $\text{gain}_{Low\_post\_filt}(k)$ is the finally obtained second filter gain corresponding to the $k^{th}$ sub-spectrum, $\text{gain}_{f1}(k)$ is the second filter gain adjusted according to Formula (17), k=0, 1, . . . , 13, and k is an index number of a subband, which indicates 14 subbands. Therefore, filter gains (that is, the foregoing second filter gains) respectively corresponding to the 14 subbands are obtained.

Specifically, the foregoing describes calculation of the first filter gain of the initial low-frequency domain coefficients by using an example in which five initial low-frequency domain coefficients are divided into one subband, that is, the 70 initial low-frequency domain coefficients are divided into 14 subbands, each subband including five initial low-frequency domain coefficients. The obtained second filter gain corresponding to each subband is filter gains of five initial low-frequency domain coefficients that correspond to each subband, so that the first filter gain corresponding to the 70 initial low-frequency domain coefficients can be obtained according to the second filter gains of the 14 subbands, $[\text{gain}_{Low\_post\_filt}(0), \text{gain}_{Low\_post\_filt}(1), \ldots , \text{gain}_{Low\_post\_filt}(14)]$. In other words, after the second filter gain $\text{gain}_{Low\_post\_filt}(k)$ corresponding to the $k^{th}$ sub-spectrum is determined, the foregoing first filter gain can be obtained, the first filter gain including the second quantity of (for example, L=14) second filter gains $\text{gain}_{Low\_post\_filt}(k)$, and the second filter gain $\text{gain}_{Low\_post\_filt}(k)$ being filter gains of N spectrum coefficients that correspond to the $k^{th}$ sub-spectrum.

In the solution of this embodiment, if the narrowband signal includes at least two associated signals, the method may further include:

fusing the at least two associated signals, to obtain a narrowband signal; or respectively using each of the at least two associated signals as a narrowband signal.

Specifically, the narrowband signal may be a plurality of associated signals, for example, adjacent speech frames, so that the at least two associated signals may be fused to obtain one signal, and the one signal is used as a narrowband signal. Subsequently, the narrowband signal is extended by using the BWE method in this application, to obtain a broadband signal.

Alternatively, each of the at least two associated signals may be used as a narrowband signal, and the narrowband signal is extended by using the BWE method in the embodiments of this application, to obtain at least two corresponding broadband signals. The at least two broadband signals may be combined into one signal for output, or may be separately outputted. This is not limited in the embodiments of this application.

To better understand the method provided in the embodiments of this application, the solutions of the embodiments of this application are further described below in detail with reference to examples of specific application scenarios.

In an example, an application scenario is a PSTN (narrowband voice) and VoIP (broadband voice) interworking scenario, that is, BWE is performed on the to-be-processed narrowband signal by using narrowband voice corresponding to a PSTN telephone as a to-be-processed narrowband signal, so that a speech frame received on a VoIP receiving end is broadband voice, thereby improving the listening experience on the receiving end.

In this example, the to-be-processed narrowband signal is a signal with a sampling rate of 8000 Hz and a frame length of 10 ms, and according to the Nyquist sampling theorem, an effective bandwidth of the to-be-processed narrowband signal is 4000 Hz. In an actual voice communication scenario, an upper bound of a general effective bandwidth thereof is 3500 Hz. Therefore, in this example, a description is made by using an example in which a bandwidth of an extended broadband signal is 7000 Hz.

Figure 3:
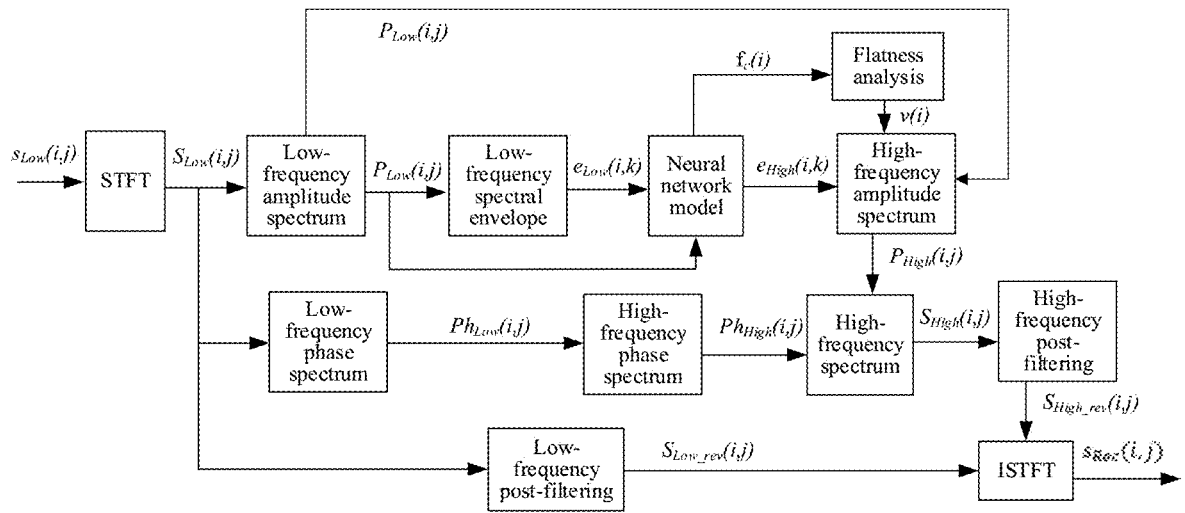
FIG. 3 is a schematic flowchart of a BWE method in a first example according to an embodiment of this application.
Figure 6:
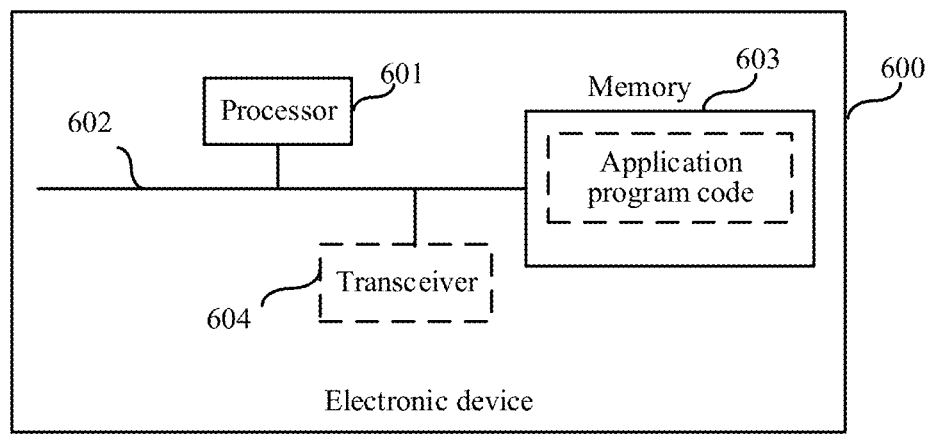
FIG. 6 is a schematic structural diagram of an electronic device according to an embodiment of this application.

In a first example shown in FIG. 3, the time-frequency transform is a Fourier transform (for example, an STFT), and a specific process may be performed by the electronic device shown in FIG. 6, which includes the following steps:

Step S1: Front-End Signal Processing:

performing upsampling processing with a sampling factor of 2 on the to-be-processed narrowband signal, and outputting an upsampled signal with a sampling rate of 16000 Hz.

Because the to-be-processed narrowband signal has a sampling rate of 8000 Hz and a frame length of 10 ms, the upsampled signal corresponds to 160 sample points (frequency points). Performing an STFT on the upsampled signal is specifically: combining 160 sample points corresponding to a previous speech frame and the 160 sample points corresponding to the current speech frame (the to-be-processed narrowband signal) into an array, the array including 320 sample points; then performing windowing (that is, windowing using a Hanning window) on the sample points in the array, to obtain a windowed signal $s_{Low}(i, j)$ and subsequently, performing a fast Fourier transform $s_{Low}(i, j)$ to obtain 320 low-frequency domain coefficients $S_{Low}(i, j)$ where i is a frame index of a speech frame, and j is an intra-frame sample index (j=0, 1, . . . , 319). In consideration of a conjugate symmetry relationship of the fast Fourier transform, a first coefficient is a direct-current component. Therefore, only first 161 low-frequency domain coefficients may be considered.

Step S2: Feature Extraction:

a) Calculate a low-frequency amplitude spectrum based on the low-frequency domain coefficients according to Formula (19):

$$P_{Low}(i,j)=\text{SQRT}(\text{Real}/(S_{Low}(i,j))^2+\text{Imag}(S_{Low}(i,j))^2) \quad (19)$$

where $P_{Low}(i, j)$ represents the low-frequency amplitude spectrum, $S_{Low}(i, j)$ is the low-frequency domain coefficient, Real and Imag are respectively a real part and an imaginary part of the low-frequency domain coefficient, and SQRT is a square root finding operation. If the to-be-processed narrowband signal is a signal with a sampling rate of 16000 Hz and a bandwidth of 0 to 3500 Hz, spectrum coefficients (low-frequency amplitude spectrum coefficients) $P_{Low}(i, j)=0, 1, \ldots , 69)$ of 70 low-frequency amplitude spectra may be determined based on the sampling rate and a frame length of the to-be-processed narrowband signal by using the low-frequency domain coefficients. In one embodiment, the 70 calculated low-frequency amplitude spectrum coefficients may be directly used as a low-frequency amplitude spectrum of the to-be-processed narrowband signal. Further, for ease of calculation, the low-frequency amplitude spectrum may be further transformed into a logarithmic domain.

After a low-frequency amplitude spectrum including the 70 coefficients is obtained, a low-frequency spectral envelope of the to-be-processed narrowband signal can be determined based on the low-frequency amplitude spectrum.

B) Further, determine the low-frequency spectral envelope based on the low-frequency amplitude spectrum in the following manner:

For 70 spectrum coefficients of the low-frequency amplitude spectrum, band division is performed on the to-be-processed narrowband signal, a band corresponding to spectrum coefficients of every five adjacent amplitude subspectra may be divided into one subband, and 14 subbands in total are obtained through division, each subband corresponding to five spectrum coefficients. For each subband, a low-frequency spectral envelope of each subband is defined as average energy of adjacent spectrum coefficients. The low-frequency spectral envelope may be specifically calculated by using Formula (20):

$$e_{Low}(i, k) = \frac{\sum_{j=0}^{4} \log(P_{Low}(i, k*5 + j))}{5} \quad (20)$$

where $e_{Low}(i, k)$ represents a sub-spectral envelope (a low-frequency spectral envelope of each subband), k represents an index number of a subband, there are 14 subbands in total, and k=0, 1, 2, . . . , 13, so that the low-frequency spectral envelope includes 14 sub-spectral envelopes.

Generally, a spectral envelope of a subband is defined as average energy (or further transformed into a logarithmic representation) of adjacent coefficients. However, this manner may cause a coefficient with a relatively small amplitude to fail to play a substantive role. This embodiment provides a solution of directly averaging logarithm identities of spectrum coefficients included in each amplitude sub-spectrum to obtain a sub-spectral envelope corresponding to each amplitude sub-spectrum, which, compared with an existing common envelope determining solution, can better protect a coefficient with a relatively small amplitude in distortion control during training of the neural network model, so that more signal parameters can play corresponding roles in the BWE.

Therefore, a 70-dimensional low-frequency amplitude spectrum and a 14-dimensional low-frequency spectral envelope may be used as an input of the neural network model.

Step S3: An Input into the Neural Network Model:

Input layer: The 84-dimensional feature vector is inputted into the neural network model.

Output layer: Considering that a target bandwidth of BWE in this embodiment is 7000 Hz, high-frequency spectral envelopes of 14 subbands corresponding to a band of 3500 Hz to 7000 Hz need to be predicted, and then a basic BWE function can be implemented. Generally, a low-frequency portion of a speech frame includes a large quantity of harmonic-like structures such as a pitch and a resonance peak; and a spectrum of a high-frequency portion is flatter. If only a low-frequency spectrum is simply replicated to a high-frequency portion, to obtain an initial high-frequency amplitude spectrum, and gain control based on subbands is performed on the initial high-frequency amplitude spectrum, the reconstructed high-frequency portion may generate excessive harmonic-like structures, which cause distortion, and affect the listening experience. Therefore, in this example, based on relative flatness information predicted by the neural network model, a relative flatness of the low-frequency portion and the high-frequency portion is described, and the initial high-frequency amplitude spectrum is adjusted, so that the adjusted high-frequency portion is flatter, and interference from harmonic waves is reduced.

In this example, an amplitude spectrum of the high-frequency band portion in the low-frequency amplitude spectrum is replicated twice, to generate the initial high-frequency amplitude spectrum, and simultaneously a band in the high-frequency portion is equally divided into two subband regions, which are respectively a first subband region and a second subband region. The high-frequency portion corresponds to 70 spectrum coefficients, and each subband region corresponds to 35 spectrum coefficients. Therefore, flatness analysis is performed on the high-frequency portion twice. That is, flatness analysis is performed on each subband region once. The low-frequency portion, especially, a band corresponding to a bandwidth less than 1000 Hz, includes richer harmonic wave components. Therefore, in this embodiment, spectrum coefficients corresponding to the $35^{th}$ frequency point to the $69^{th}$ frequency point are used as a "master", so that a band corresponding to the first subband region is a band corresponding to the $70^{th}$ frequency point to the $104^{th}$ frequency point, and a band corresponding to the second subband region is a band corresponding to the $105^{th}$ frequency point to the $139^{th}$ frequency point.

A variance analysis method defined in classical statistics may be used for the flatness analysis. An oscillation degree of a spectrum can be described by using the variance analysis method, and a larger value indicates richer harmonic wave components.

Based on the foregoing descriptions, because harmonic waves included in a low-frequency band of the low-frequency portion of the sample narrowband signal are richer, a high-frequency band in the low-frequency portion of the sample narrowband signal may be selected as a reference for determining the relative flatness information. That is, the high-frequency band (a band corresponding to the $35^{th}$ frequency point to the $69^{th}$ frequency point) of the low-frequency portion is used as a master, and the high-frequency portion of the sample broadband signal is correspondingly classified into at least two subband regions. Relative flatness information of each subband region is determined based on a spectrum of each subband region of the high-frequency portion and a spectrum of the low-frequency portion.

In a training stage of the neural network model, relative flatness information of each subband region in a high-frequency portion of a spectrum of a sample broadband signal may be determined based on sample data (the sample data includes a sample narrowband signal and a corresponding sample broadband signal) by using a variance analysis method.

In an example, if a high-frequency portion of a sample broadband signal is classified into two subband regions, which are respectively a first subband region and a second subband region, relative flatness information of a high-frequency portion and a low-frequency portion of the sample broadband signal may be first relative flatness information of the first subband region and a high-frequency band of the low-frequency portion of the sample broadband signal and second relative flatness information of the second subband region and the high-frequency band of the low-frequency portion of the sample broadband signal.

When the time-frequency transform is a Fourier transform, a specific determining manner of the first relative flatness information and the second relative flatness information may be: calculating the following three variances based on a frequency domain coefficient $S_{Low,sample}(i, j)$ of the narrowband signal in the sample data and a frequency domain coefficient $S_{High,sample}(i, j)$ of the high-frequency portion of the broadband signal in the sample data by using Formula (21) to Formula (23):

$$\text{var}_L(S_{Low,sample}(i,j)), j=35,36,\ldots,69 \quad (21)$$

$$\text{var}_{H1}(S_{High,sample}(i,j)), j=70,71,\ldots,104 \quad (22)$$

$$\text{var}_{H2}(S_{High,sample}(i,j)), j=105,106,\ldots,139 \quad (23)$$

where Formula (21) is a variance of an amplitude spectrum of the high-frequency band of the low-frequency portion of the sample narrowband signal; Formula (22) is a variance of an amplitude spectrum of the first subband region; Formula (23) is a variance of an amplitude spectrum of the second subband region; var( ) represents variance calculation, and variance of a spectrum may be represented based on corresponding spectrum domain coefficients; and $S_{Low,sample}(i, j)$ represents a spectrum domain coefficient of the sample narrowband signal.

Relative flatness information of an amplitude spectrum of each subband region and the amplitude spectrum of the high-frequency band of the low-frequency portion are determined based on the foregoing three variances by using Formula (24) and Formula (25).

$$fc(0) = \log\left(\frac{var_L}{var_{H1}}\right) \quad (24)$$

$$fc(1) = \log\left(\frac{var_L}{var_{H2}}\right) \quad (25)$$

where fc(0) represents first relative flatness information of the amplitude spectrum of the first subband region and the amplitude spectrum of the high-frequency band of the low-frequency portion, and fc(1) represents second relative flatness information of the amplitude spectrum of the second subband region and the amplitude spectrum of the high-frequency band of the low-frequency portion.

The two values fc(0) and fc(1) may be classified depending on whether the two values are greater than or equal to 0, and fc(0) and fc(1) are defined as a binary classification array, so that the array includes four permutations and combinations: {0,0}, {0,1}, {1,0}, {1,1}.

In this way, relative flatness information outputted by the model may be four probability values, the probability values being used for identifying probabilities that the relative flatness information belongs to the four arrays.

Based on the principle of maximum probability, one of the four permutations and combinations of the array may be selected as predicted relative flatness information of amplitude spectra of extended regions of the two subband regions and an amplitude spectrum of the high-frequency band of the low-frequency portion. Specifically, the relative flatness information may be represented by using Formula (26):

$$v(i,k)=0 \text{ or } 1, k=0,1 \quad (26)$$

where v(i, k) represents the relative flatness information of the amplitude spectra of the extended regions of the two subband regions and the amplitude spectrum of the high-frequency band of the low-frequency portion, and k represents an index of a different subband region, so that each subband region can correspond to one piece of relative flatness information. For example, when k=0, v(i, k)=0 represents that the first subband region is more oscillatory than the low-frequency portion, that is, have a poorer flatness; and v(i, k)=1 represents that the first subband region is flatter than the low-frequency portion, that is, have a better flatness.

Step S4: Generation of a High-Frequency Amplitude Spectrum:

As described above, the low-frequency amplitude spectrum (including the $35^{th}$ frequency point to the $69^{th}$ frequency point, which are 35 frequency points in total) is replicated twice, to generate a high-frequency amplitude spectrum (including 70 frequency points in total). Predicted relative flatness information of a high-frequency portion of a target broadband spectrum can be obtained based on initial low-frequency domain coefficients or filtered low-frequency domain coefficients corresponding to the narrowband signal by using the trained neural network model. In this example, frequency domain coefficients of a first low-frequency spectrum corresponding to the $35^{th}$ frequency point to the $69^{th}$ frequency point are selected, so that relative flatness information of at least two subband regions of the high-frequency portion of the target broadband spectrum can be predicted by using the trained neural network model. That is, the high-frequency portion of the target broadband spectrum is divided into at least two subband regions. In this example, the high-frequency portion is divided into two subband regions, so that an output of the neural network model is relative flatness information of the two subband regions.

Post-filtering is performed on a reconstructed high-frequency amplitude spectrum according to the predicted relative flatness information corresponding to two BWE regions. Using the first subband region as an example, the following main steps are included:

(1) parsing v(i, k), where if v(i, k) is 1, it indicates that the high-frequency portion is very flat, and if v(i, k) is 0, it indicates that the high-frequency portion is oscillatory;

(2) dividing 35 frequency points in the first subband region into seven subbands, where a high-frequency spectral envelope includes 14 first sub-spectral envelopes, and a low-frequency spectral envelope includes 14 second sub-spectral envelopes, so that each subband may correspond to one first sub-spectral envelope; separately calculating average energy pow_env (the spectrum power information corresponding to the second sub-spectral envelope) of each subband, and calculating an average value Mpow_env (the spectrum power information corresponding to the subband region corresponding to the second sub-spectral envelope) of average energy of the seven subbands, where the average energy of each subband is determined based on a corresponding low-frequency amplitude spectrum, for example, a square of an absolute value of a spectrum coefficient of each low-frequency amplitude spectrum is used as energy of the low-frequency amplitude spectrum, and one subband corresponds to spectrum coefficients of five low-frequency amplitude spectra, so that an average value of energy of low-frequency amplitude spectra corresponding to a subband can be used as average energy of the subband; and (3) calculating a gain adjustment value of each first sub-spectral envelope based on parsed relative flatness information corresponding to the first subband region, the average energy pow_env, and the average value Mpow_env, specifically including:

when $v(i,k)=1, G(j)=a_1+b_1*\text{SQRT}(M\text{pow\_env/pow\_env}(j)), j=0,1,\ldots,6;$ when $v(i,k)=0, G(j)=a_0+b_0*\text{SQRT}(M\text{pow\_env/pow\_env}(j)), j=0,1,\ldots,6;$ where in this example, $a_1=0.875$, $b_1=0.125$, $a_0=0.925$, $b_0=0.075$, and G(j) is a gain adjustment value.

For a case that v(i, k)=0, the gain adjustment value is 1, that is, no flattening operation (adjustment) needs to be performed on the high-frequency spectral envelope.

(4) Based on the foregoing manner, a gain adjustment value corresponding to each first sub-spectral envelope in the high-frequency spectral envelope $e_{High}(i, k)$ can be determined, and the corresponding first sub-spectral envelope is adjusted based on the gain adjustment value corresponding to each first sub-spectral envelope. The operation can reduce the average energy difference of different subbands, and perform different degrees of flattening processing on the spectrum corresponding to the first subband region.

It may be understood that the high-frequency spectral envelope corresponding to the second subband region may be adjusted in a manner the same as the above. Details are not described herein again. The high-frequency spectral envelopes include 14 frequency subbands in total, so that 14 gain adjustment values can be correspondingly determined, and corresponding sub-spectral envelopes are adjusted based on the 14 gain adjustment values.

Further, a first difference between the adjusted high-frequency spectral envelope and the low-frequency spectral envelope is determined based on the adjusted high-frequency spectral envelope, and the initial high-frequency amplitude spectrum is adjusted based on the difference, to obtain a target high-frequency amplitude spectrum $P_{High}(i, j)$.

Step S5: Generation of a High-Frequency Spectrum:

Generating a corresponding high-frequency phase spectrum $Ph_{High}(i, j)$ based on a low-frequency phase spectrum $Ph_{Low}(i, j)$ may include any one of the following manners:

First manner: A corresponding high-frequency phase spectrum is obtained by replicating the low-frequency phase spectrum.

Second manner: The low-frequency phase spectrum is flipped, and a phase spectrum the same as the low-frequency phase spectrum is obtained after the flipping. The two low-frequency phase spectra are mapped to corresponding high-frequency points, to obtain a corresponding high-frequency phase spectrum.

High-frequency domain coefficients $S_{High}(i, j)$ are generated according to the high-frequency amplitude spectrum and the high-frequency phase spectrum; and a high-frequency spectrum is generated based on the low-frequency domain coefficients and the high-frequency domain coefficients.

Step S6: High-Frequency Post-Filtering:

The high-frequency post-filtering is to filter obtained initial high-frequency domain coefficients, to obtain filtered initial high-frequency domain coefficients, recorded as high-frequency domain coefficients. In the filtering process, the high-frequency domain coefficients are filtered by using filter gains determined based on the high-frequency domain coefficients, specifically shown in Formula (27):

$$S_{High\_rev}(i,j) = G_{high\_post\_filt}(j) * S_{High}(i,j) \tag{27}$$

where $G_{high\_post\_filt}(j)$ is a filter gain calculated according to a high-frequency domain coefficient, $S_{High}(i, j)$ is an initial high-frequency domain coefficient, and $S_{High\_rev}(i, j)$ is a high-frequency domain coefficient obtained through filtering.

In this example, assuming that every five initial frequency domain coefficients in the same subband share one filter gain, a specific calculation process of the filter gain is as follows:

(1) Band division is performed on the initial low-frequency domain coefficients. For example, five adjacent initial low-frequency domain coefficients are combined into one sub-spectrum. This example corresponds to 14 subbands. Average energy is calculated for each subband. Particularly, energy of each frequency point (that is, the initial low-frequency domain coefficient) is defined as a sum of a square of a real part and a square of an imaginary part. Energy values of five adjacent frequency points are calculated by using Formula (28), and a sum of the energy values of the five frequency points is first spectrum power of the current sub-spectrum:

$$Pe(k) = \sum_{j=0}^{4} \text{Real}(S_{High}(i, k*5+j))^2 + \text{Imag}(S_{High}(i, k*5+j))^2 \tag{28}$$

where $S_{High}(i, j)$ is an initial high-frequency domain coefficient, Real and Imag are respectively a real part and an imaginary part of the initial high-frequency domain coefficient, Pe(k) is first spectrum power, k=0, 1, ... 13, and k is an index number of a subband, which indicates 14 subbands.

(2) The first spectrum power of the current sub-spectrum is calculated based on inter-frame correlations by using at least one of Formula (29) and Formula (30):

$$Fe(k)=1.0+Pe(k)+Pe_{pre}(k) \tag{29}$$

$$Fe\_sm(k)=(Fe(k)+Fe_{pre}(k))/2 \tag{30}$$

where Fe(k) is a smooth term of the first spectrum power of the current sub-spectrum, Pe(k) is the first spectrum power of the current sub-spectrum of the current speech frame, $Pe_{pre}(k)$ is second initial spectrum power of a sub-spectrum, corresponding to the current sub-spectrum, of an associated speech frame of the current speech frame, Fe_sm(k) is a smooth term of first spectrum power after accumulation and averaging, and $Fe_{pre}(k)$ is a smooth term of first spectrum power, corresponding to the current sub-spectrum, of the associated speech frame of the current speech frame, where the associated speech frame is at least one speech frame previous to and adjacent to the current speech frame, so that a short-term correlation and a long-term correlation between speech signal frames are fully considered.

(3) The spectral tilt coefficient of the initial spectrum is calculated, and a band corresponding to the initial spectrum is equally divided into a first subband and a second subband. First subband power of the first subband and second subband power of the second subband are respectively calculated, and a calculation Formula (31) is as follows:

$$e1 = 1 + \sum_{k=0}^{6} Fe\_sm(k) \tag{31}$$

$$e2 = 1 + \sum_{k=7}^{13} \text{Fe\_sm}(k)$$

where e1 is the first subband power of the first subband, and e2 is the second subband power of the second subband.

Subsequently, the spectral tilt coefficient of the initial spectrum is determined according to e1 and e2 based on the following logic:

If (e2>=e1):

$T\_para=0$;

Else:

$T\_para=8*f\_cont\_low*SQRT((e1-e2)/(e1+e2))$;

$T\_para=\min(1.0,T\_para)$;

$T\_para=T\_para/7$;

where T_para is the spectral tilt coefficient; SQRT is a square root finding operation; f_cont_low=0.07, and f_cont_low is a preset filter coefficient; and 7 is a half of a total quantity of sub-spectra.

(4) A second filter gain of each sub-spectrum is calculated, and the calculation may be performed according to Formula (32):

$$\text{gain}_{f0}(k) = Fe(k)^{f\_cont\_low} \quad (32)$$

where $\text{gain}_{f0}(k)$ is a second filter gain of the $k^{th}$ sub-spectrum; f_cont_low is a preset filter coefficient; and in a solution, f_cont_low=0.07, Fe(k) is a smooth term of first spectrum power of the $k^{th}$ sub-spectrum, k=0, 1, ..., 13, and k is an index number of a subband, which indicates 14 subbands.

Subsequently, if the spectral tilt coefficient T_para is positive, the second filter gain $\text{gain}_{f0}(k)$ further needs to be adjusted according to Formula (33):

If (T_para>0):

$$\text{gain}_{f1}(k) = \text{gain}_{f0}(k) * (1 + k * T_{para}) \quad (33)$$

(5) Filter gain values after high-frequency post-filtering are obtained according to Formula (34):

$$\text{gain}_{High\_post\_filt}(k) = (1 + \text{gain}_{f1}(k))/2 \quad (34)$$

where $\text{gain}_{f1}(k)$ is the second filter gain adjusted according to Formula (33); $\text{gain}_{High\_post\_filt}(k)$ is a filter gain (namely, the second filter gain), that is finally obtained according to $\text{gain}_{f1}(k)$, of five high-frequency domain coefficients corresponding to the $k^{th}$ sub-spectrum; $\text{gain}_{f1}(k)$ is the adjusted second filter gain; k=0, 1, ..., 13, and k indicates 14 subbands.

Specifically, after the second filter gain $\text{gain}_{High\_post\_filt}(k)$ corresponding to the $k^{th}$ sub-spectrum is determined, because a first filter gain includes the second quantity of (for example, L=14) second filter gains $\text{gain}_{High\_post\_filt}(k)$, and the second filter gains $\text{gain}_{High\_post\_filt}(k)$ are filter gains of N spectrum coefficients corresponding to the $k^{th}$ sub-spectrum, the first filter gain $G_{High\_post\_filt}(j)$ can be obtained.

Step S7: Low-Frequency Post-Filtering:

The low-frequency post-filtering is to filter initial low-frequency domain coefficients obtained by performing an STFT on the to-be-processed narrowband signal, to obtain low-frequency domain coefficients. In the filtering process, the low-frequency domain coefficients are filtered by using filter gains determined based on the low-frequency domain coefficients, as shown in Formula (35):

$$S_{Low\_rev}(i,j) = G_{Low\_post\_filt}(j) * S_{Low}(i,j) \quad (35)$$

where $G_{Low\_post\_filt}(j)$ is a filter gain calculated according to an initial low-frequency domain coefficient, $S_{Low}(i, j)$ is the initial low-frequency domain coefficient, and $S_{Low\_rev}(i, j)$ is a low-frequency domain coefficient obtained through filtering.

In this example, assuming that every five initial low-frequency domain coefficients in the same subband share one filter gain, a specific calculation process of the filter gain is as follows:

(1) Band division is performed on the initial low-frequency domain coefficients. For example, five adjacent initial low-frequency domain coefficients are combined into one sub-spectrum. This example corresponds to 14 sub-bands. Average energy is calculated for each subband. Particularly, energy of each frequency point (that is, the initial low-frequency domain coefficient) is defined as a sum of a square of a real part and a square of an imaginary part. Energy values of five adjacent frequency points are calculated by using Formula (36), and a sum of the energy values of the five frequency points is first spectrum power of the current sub-spectrum:

$$Pe(k) = \sum_{j=0}^{4} \text{Real } (S_{Low}(i, k*5+j))^2 + \text{Imag}(S_{Low}(i, k*5+j))^2 \quad (36)$$

where $S_{Low}(i, j)$ is an initial low-frequency domain coefficient, Real and Imag are respectively a real part and an imaginary part of the initial low-frequency domain coefficient, Pe(k) is first spectrum power, k=0, 1, ... 13, and k is an index number of a subband, which indicates 14 subbands.

(2) The first spectrum power of the current sub-spectrum is calculated based on inter-frame correlations by using at least one of Formula (37) and Formula (38):

$$Fe(k) = 1.0 + Pe(k) + Pe_{pre}(k) \quad (37)$$

$$Fe\_sm(k) = (Fe(k) + Fe_{pre}(k))/2 \quad (38)$$

where Fe(k) is a smooth term of the first spectrum power of the current sub-spectrum, Pe(k) is the first spectrum power of the current sub-spectrum of the current speech frame, $Pe_{pre}(k)$ is second initial spectrum power of a sub-spectrum, corresponding to the current sub-spectrum, of an associated speech frame of the current speech frame, Fe_sm (k) is a smooth term of first spectrum power after accumulation and averaging, and $Fe_{pre}$ (k) is a smooth term of first spectrum power, corresponding to the current sub-spectrum, of the associated speech frame of the current speech frame, the associated speech frame being at least one speech frame previous to and adjacent to the current speech frame.

(3) The spectral tilt coefficient of the initial spectrum is calculated, and a band corresponding to the initial spectrum is equally divided into a first subband and a second subband. First subband power of the first subband and second subband power of the second subband are respectively calculated, and a calculation Formula (39) is as follows:

$$e1 = 1 + \sum_{k=0}^{6} \text{Fe\_sm}(k) \quad (39)$$

$$e2 = 1 + \sum_{k=7}^{13} \text{Fe\_sm}(k)$$

where e1 is the first subband power of the first subband, and e2 is the second subband power of the second subband.

Subsequently, the spectral tilt coefficient of the initial spectrum is determined according to e1 and e2 based on the following logic:

If (e2>=e1):

$T\_para=0$;

Else:

$T\_para=8*f\_cont\_low*SQRT((e1-e2)/(e1+e2))$;

$T\_para=\min(1.0, T\_para)$;

$T\_para=T\_para/7$;

where T_para is the spectral tilt coefficient; SQRT is a square root finding operation; f_cont_low=0.035, and f_cont_low is a preset filter coefficient; and 7 is a half of a total quantity of sub-spectra.

(4) A second filter gain of each sub-spectrum is calculated, and the calculation may be performed according to Formula (40):

$$gain_{f0}(k) = Fe(k)^{f\_cont\_low} \quad (40)$$

where $gain_{f0}(k)$ is a second filter gain of the $k^{th}$ sub-spectrum; f_cont_low is a preset filter coefficient; and in a solution, f_cont_low=0.035, Fe(k) is a smooth term of first spectrum power of the $k^{th}$ sub-spectrum, k=0, 1, . . . , 13, and k is an index number of a subband, which indicates 14 subbands.

Subsequently, if the spectral tilt coefficient T_para is positive, the second filter gain $gain_{f0}(k)$ further needs to be adjusted according to Formula (41):

If (T_para>0):

$$gain_{f1}(k) = gain_{f0}(k) * (1 + k*T_{para}) \quad (41)$$

where $gain_{f1}(k)$ is the second filter gain adjusted according to the spectral tilt coefficient T_para.

(5) Filter gain values after the low-frequency post-filtering are obtained according to Formula (42):

$$gain_{Low\_post\_filt}(k) = (1 + gain_{f1}(k))/2 \quad (42)$$

where $gain_{f1}(k)$ is the second filter gain adjusted according to Formula (41); $gain_{Low\_post\_filt}(k)$ is a filter gain (namely, the second filter gain), that is finally obtained according to $gain_{f1}(k)$, of five low-frequency domain coefficients corresponding to the $k^{th}$ sub-spectrum; $gain_{f1}(k)$ is the adjusted second filter gain; k=0, 1, . . . , 13, and k is an index number of a subband, which indicates 14 subbands.

Specifically, after the second filter gain $gain_{Low\_post\_filt}(k)$ corresponding to the $k^{th}$ sub-spectrum is determined, because a first filter gain includes the second quantity of (for example, L=14) second filter gains $gain_{Low\_post\_filt}(k)$, and the second filter gains $gain_{Low\_post\_filt}(k)$ are filter gains of N spectrum coefficients corresponding to the $k^{th}$ sub-spectrum, the first filter gain $G_{Low\_post\_filt}(j)$ can be obtained.

Step S8: Frequency-Time Transform, that is, an Inverse STFT (ISTFT):

A broadband signal after BWE is obtained based on a low-frequency spectrum and a high-frequency spectrum.

Specifically, the low-frequency domain coefficients $S_{Low\_rev}(i, j)$ and the high-frequency domain coefficients $S_{High\_rev}(i, j)$ are combined, to generate a high-frequency spectrum. An inverse transform of a time-frequency transform (that is, an ISTFT) is performed based on the low-frequency spectrum and the high-frequency spectrum, and a new speech frame $s_{Rec}(i, j)$, that is, a broadband signal, can be generated.

In this case, an effective spectrum of the to-be-processed narrowband signal has been extended into 7000 Hz.

Figure 4:
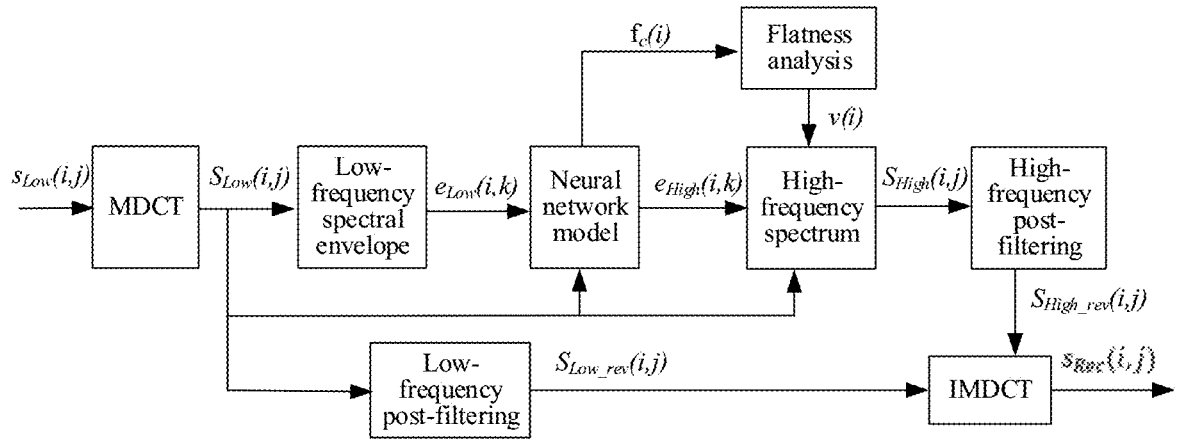
FIG. 4 is a schematic flowchart of a BWE method in a second example according to an embodiment of this application.

In a second example shown in FIG. 4, the time-frequency transform is an MDCT. In the foregoing first example, the time-frequency transform on the to-be-processed narrowband signal is based on an STFT, and according to the classical signal theory, each signal frequency point includes amplitude information and phase information. In the first example, a phase of a high-frequency portion is directly mapped from a low-frequency portion, and there is a specific error. Therefore, an MDCT is used in the second example. The MDCT is still windowing and overlapping similar to those in the first example, but a generated MDCT coefficient is a real number, which includes more information. BWE can be completed only by utilizing a correlation between a high-frequency MDCT coefficient and a low-frequency MDCT coefficient and using a neural network model similar to that in the first example. A specific process includes the following steps:

Step T1: Front-End Signal Processing:

performing upsampling processing with a sampling factor of 2 on the to-be-processed narrowband signal, and outputting an upsampled signal with a sampling rate of 16000 Hz.

Because the to-be-processed narrowband signal has a sampling rate of 8000 Hz and a frame length of 10 ms, the upsampled signal corresponds to 160 sample points (frequency points). Performing an MDCT on the upsampled signal is specifically: combining 160 sample points corresponding to a previous speech frame and the 160 sample points corresponding to the current speech frame (the to-be-processed narrowband signal) into an array, the array including 320 sample points; and then, performing windowing using a cosine window on the sample points in the array, and performing an MDCT on a windowed signal $s_{Low}(i, j)$, to obtain 160 low-frequency domain coefficients $S_{Low}(i, j)$, where i is a frame index of a speech frame, and j is an intra-frame sample index (j=0, 1, . . . , 159).

Step T2: Feature Extraction:

a) Obtain low-frequency domain coefficients $S_{Low}(i, j)$.

If the narrowband signal is a signal with a sampling rate of 16000 Hz and a bandwidth of 0 to 3500 Hz, 70 low-frequency domain coefficients may be determined from $S_{Low}(i, j)=(j=0, 1, . . . , 69)$ based on the sampling rate and a frame length of the to-be-processed narrowband signal.

After the 70 low-frequency domain coefficients are obtained, a low-frequency spectral envelope of the to-be-processed narrowband signal can be determined based on the 70 low-frequency domain coefficients. The low-frequency spectral envelope may be determined based on the low-frequency domain coefficients in the following manner:

Band division is performed on the to-be-processed narrowband signal. For the 70 low-frequency domain coefficients, a band corresponding to every five adjacent low-frequency domain coefficients may be divided into one subband, and a total of 14 subbands are obtained through division, each subband corresponding to five low-frequency domain coefficients. For each subband, a low-frequency spectral envelope of each subband is defined as average energy of adjacent low-frequency domain coefficients. The low-frequency spectral envelope may be specifically calculated by using Formula (43):

$$e_{Low}(i, k) = \sqrt{\frac{\sum_{j=0}^{4}(S_{Low}(i, k*5+j))^2}{5}} \quad (43)$$

where $e_{Low}(i, k)$ represents a sub-spectral envelope (a low-frequency spectral envelope of each subband), k represents an index number of a subband, there are 14 subbands in total, and k=0, 1, 2, . . . , 13, so that the low-frequency spectral envelope includes 14 sub-spectral envelopes.

Therefore, a 70-dimensional low-frequency domain coefficient $S_{Low}(i, j)$ and a 14-dimensional low-frequency spectral envelope $e_{Low}(i, k)$ an may be used as input of the neural network model.

Step T3: Neural Network Model:

Input layer: The 84-dimensional feature vector is inputted into the neural network model.

Output layer: Considering that a target bandwidth of BWE in this embodiment is 7000 Hz, high-frequency spectral envelopes $e_{High}(i, k)$ of 14 subbands corresponding to a band of 3500 Hz to 7000 Hz need to be predicted. In addition, four probability densities f c correlated with flatness information may further be simultaneously outputted, that is, an output result is 18-dimensional.

A processing process of the neural network model in the second example is the same as that of the neural network model in the first example. Details are not described herein again.

Step T4: Generation of a High-Frequency Amplitude Spectrum:

Similar to the first example, a flatness relationship v(i, k) between two high-frequency subband regions and a low-frequency portion is generated based on the flatness information through flatness analysis similar to that in the first example, and then a high-frequency MDCT coefficient $S_{High}(i, j)$ can be generated with reference to the high-frequency spectral envelope $e_{High}(i, k)$ by using a process similar to that in the first example.

Step T5: High-Frequency Post-Filtering:

The high-frequency post-filtering is to filter obtained initial high-frequency domain coefficients, to obtain filtered initial high-frequency domain coefficients, recorded as high-frequency domain coefficients. In the filtering process, the high-frequency domain coefficients are filtered by using filter gains determined based on the high-frequency domain coefficients, specifically shown in Formula (44):

$$S_{High\_rev}(i,j)=G_{High\_post\_filt}(j)*S_{High}(i,j) \quad (44)$$

where $G_{High\_post\_filt}(j)$ is a filter gain calculated according to a high-frequency domain coefficient, $S_{High}(i, j)$ is an initial high-frequency domain coefficient, and $S_{High\_rev}(i, j)$ is a high-frequency domain coefficient obtained through filtering.

A specific processing process of the high-frequency post-filtering is similar to a specific processing process of the foregoing high-frequency post-filtering, which is specifically as follows:

In this example, assuming that every five initial frequency domain coefficients in the same subband share one filter gain, a specific calculation process of the filter gain is as follows:

(1) Band division is performed on the initial low-frequency domain coefficients. For example, five adjacent initial low-frequency domain coefficients are combined into one sub-spectrum. This example corresponds to 14 subbands. Average energy is calculated for each subband. Particularly, energy of each frequency point (that is, the initial low-frequency domain coefficient) is defined as a sum of a square of a real part and a square of an imaginary part. Energy values of five adjacent frequency points are calculated by using Formula (45), and a sum of the energy values of the five frequency points is first spectrum power of the current sub-spectrum:

$$Pe(k)=\Sigma_{j=0}^{4}(S_{High}(i,k*5+j))^2 \quad (45)$$

where $S_{High}(i, j)$ is an initial high-frequency domain coefficient, Pe(k) is first spectrum power, k=0, 1, . . . 13, and k is an index number of a subband, which indicates 14 subbands.

(2) The first spectrum power of the current sub-spectrum is calculated based on inter-frame correlations by using at least one of Formula (46) and Formula (47):

$$Fe(k)=1.0+Pe(k)+Pe_{pre}(k) \quad (46)$$

$$Fe\_sm(k)=(Fe(k)+Fe_{pre}(k))/2 \quad (47)$$

where Fe(k) is a smooth term of the first spectrum power of the current sub-spectrum, Pe(k) is the first spectrum power of the current sub-spectrum of the current speech frame, $Pe_{pre}(k)$ is second initial spectrum power of a sub-spectrum, corresponding to the current sub-spectrum, of an associated speech frame of the current speech frame, Fe_sm(k) is a smooth term of first spectrum power after accumulation and averaging, and $Fe_{pre}(k)$ is a smooth term of first spectrum power, corresponding to the current sub-spectrum, of the associated speech frame of the current speech frame, where the associated speech frame is at least one speech frame previous to and adjacent to the current speech frame, so that a short-term correlation and a long-term correlation between speech signal frames are fully considered.

(3) The spectral tilt coefficient of the initial spectrum is calculated, and a band corresponding to the initial spectrum is equally divided into a first subband and a second subband. First subband power of the first subband and second subband power of the second subband are respectively calculated, and a calculation Formula (48) is as follows:

$$e1 = 1 + \sum_{k=0}^{6} Fe\_sm(k) \quad (48)$$

$$e2 = 1 + \sum_{k=7}^{13} Fe\_sm(k)$$

where e1 is the first subband power of the first subband, and e2 is the second subband power of the second subband.

Subsequently, the spectral tilt coefficient of the initial spectrum is determined according to e1and e2 based on the following logic:

If (e2>=e1):

$T\_para=0$;

Else:

$T\_para=8*f\_cont\_low*SQRT((e1-e2)/(e1+e2))$;

$T\_para=\min(1.0,T\_para)$;

$T\_para=T\_para/7$;

where T_para is the spectral tilt coefficient; SQRT is a square root finding operation; f_cont_low=0.07, and f_cont_low is a preset filter coefficient; and 7 is a half of a total quantity of sub-spectra.

(4) A second filter gain of each sub-spectrum is calculated, and the calculation may be performed according to Formula (49):

$$gain_{f0}(k)=Fe(k)^{f\_cont\_low} \quad (49)$$

where $\text{gain}_{f0}(k)$ is a second filter gain of the $k^{th}$ sub-spectrum; f_cont_low is a preset filter coefficient; and in a solution, f_cont_low=0.07, Fe (k) is a smooth term of first spectrum power of the $k^{th}$ sub-spectrum, k=0, 1, ..., 13, and k is an index number of a subband, which indicates 14 subbands in total.

Subsequently, if the spectral tilt coefficient T_para is positive, the second filter gain $\text{gain}_{f0}(k)$ further needs to be adjusted according to Formula (50):

If (T_para>0):

$$\text{gain}_{f1}(k)=\text{gain}_{f0}(k)*(1+k*T_{para}) \qquad (50)$$

(5) Filter gain values after high-frequency post-filtering are obtained according to Formula (51):

$$\text{gain}_{High\_post\_filt}(k)=(1+\text{gain}_{f1}(k))/2 \qquad (51)$$

where $\text{gain}_{f1}(k)$ is the second filter gain adjusted according to Formula (50); $\text{gain}_{High\_post\_filt}(k)$ is a filter gain (namely, the second filter gain), that is finally obtained according to $\text{gain}_{f1}(k)$, of five low-frequency domain coefficients corresponding to the $k^{th}$ sub-spectrum; $\text{gain}_{f1}(k)$ is the adjusted second filter gain; k=0, 1, ..., 13, and k is an index number of a subband, which indicates 14 subbands in total.

Specifically, after the second filter gain $\text{gain}_{High\_post\_filt}(k)$ corresponding to the $k^{th}$ sub-spectrum is determined, because a first filter gain includes the second quantity of (for example, L=14) second filter gains $\text{gain}_{High\_post\_filt}(k)$, and the second filter gains $\text{gain}_{High\_post\_filt}(k)$ are filter gains of N spectrum coefficients corresponding to the $k^{th}$ sub-spectrum, the first filter gain $G_{High\_post\_filt}(j)$ can be obtained.

Step T6: Low-Frequency Post-Filtering:

The low-frequency post-filtering is to filter initial low-frequency domain coefficients obtained by performing an MDCT on the to-be-processed narrowband signal, to obtain low-frequency domain coefficients. In the filtering process, the low-frequency domain coefficients are filtered by using filter gains determined based on the low-frequency domain coefficients, as shown in Formula (52):

$$S_{Low\_rev}(i,j)=G_{Low\_post\_filt}(j)*S_{Low}(i,j) \qquad (52)$$

where $G_{Low\_post\_filt}(j)$ is a filter gain calculated according to an initial low-frequency domain coefficient, $S_{Low}(i, j)$ is the initial low-frequency domain coefficient, and $S_{Low\_rev}(i, j)$ is a low-frequency domain coefficient obtained through filtering.

In this example, assuming that every five initial low-frequency domain coefficients in the same subband share one filter gain, a specific calculation process of the filter gain is as follows:

(1) Band division is performed on the initial low-frequency domain coefficients. For example, five adjacent initial low-frequency domain coefficients are combined into one sub-spectrum. This example corresponds to 14 sub-bands. Average energy is calculated for each subband. Particularly, energy of each frequency point (that is, the initial low-frequency domain coefficient) is defined as a sum of a square of a real part and a square of an imaginary part. Energy values of five adjacent frequency points are calculated by using Formula (53), and a sum of the energy values of the five frequency points is first spectrum power of the current sub-spectrum:

$$Pe(k)=\sum_{j=0}^{4}(S_{Low}(i,k*5+j))^2 \qquad (53)$$

where $S_{Low}(i, j)$ is an initial low-frequency domain coefficient, Real and Imag are respectively a real part and an imaginary part of the initial low-frequency domain coefficient, Pe(k) is first spectrum power, k=0, 1, ... 13, and k is an index number of a subband, which indicates 14 subbands.

(2) The first spectrum power of the current sub-spectrum is calculated based on inter-frame correlations by using at least one of Formula (54) and Formula (55):

$$Fe(k)=1.0+Pe(k)+P_{pre}(k) \qquad (54)$$

$$Fe\_sm(k)=(Fe(k)+Fe_{pre}(k))/2 \qquad (55)$$

where Fe(k) is a smooth term of the first spectrum power of the current sub-spectrum, Pe(k) is the first spectrum power of the current sub-spectrum of the current speech frame, $Pe_{pre}(k)$ is second initial spectrum power of a sub-spectrum, corresponding to the current sub-spectrum, of an associated speech frame of the current speech frame, Fe_sm(k) is a smooth term of first spectrum power after accumulation and averaging, and $Fe_{pre}(k)$ is a smooth term of first spectrum power, corresponding to the current sub-spectrum, of the associated speech frame of the current speech frame, the associated speech frame being at least one speech frame previous to and adjacent to the current speech frame.

(3) The spectral tilt coefficient of the initial spectrum is calculated, and a band corresponding to the initial spectrum is equally divided into a first subband and a second subband. First subband power of the first subband and second subband power of the second subband are respectively calculated, and a calculation Formula (56) is as follows:

$$e1 = 1 + \sum_{k=0}^{6} Fe\_sm(k)$$

$$e2 = 1 + \sum_{k=7}^{13} Fe\_sm(k) \qquad (56)$$

where e1 is the first subband power of the first subband, and e2 is the second subband power of the second subband.

Subsequently, the spectral tilt coefficient of the initial spectrum is determined according to e1 and e2 based on the following logic:

If (e2>=e1):

T_para=0;

Else:

T_para=8*f_cont_low*SQRT((e1−e2)/(e1+e2));

T_para=min(1.0,T_para);

T_para=T_para/7;

where T_para is the spectral tilt coefficient; SQRT is a square root finding operation; f_cont_low is a preset filter coefficient; and in a solution, f_cont_low=0.035, and 7 is a half of a total quantity of sub-spectra.

(4) A second filter gain of each sub-spectrum is calculated, and the calculation may be performed according to Formula (57):

$$\text{gain}_{f0}(k)=Fe(k)^{f\_cont\_low} \qquad (57)$$

where $\text{gain}_{f0}(k)$ is a second filter gain of the $k^{th}$ sub-spectrum; f_cont_low is a preset filter coefficient; and in a solution, f_cont_low=0.035, Fe(k) is a smooth term of first spectrum power of the $k^{th}$ sub-spectrum, k=0, 1, ..., 13, and k is an index number of a subband, which indicates 14 subbands.

Subsequently, if the spectral tilt coefficient T_para is positive, the second filter gain $\text{gain}_{f0}(k)$ further needs to be adjusted according to Formula (58):

If (T_para>0):

$$\text{gain}_{f1}(k) = \text{gain}_{f0}(k)*(1+k*T_{para}) \quad (58)$$

where $\text{gain}_{f1}(k)$ is the second filter gain adjusted according to the spectral tilt coefficient T_para.

(5) Filter gain values after the low-frequency post-filtering are obtained according to Formula (59):

$$\text{gain}_{Low\_post\_filt}(k) = (1+\text{gain}_{f1}(k))/2 \quad (59)$$

where $\text{gain}_{f1}(k)$ is the second filter gain adjusted according to Formula (58); $\text{gain}_{Low\_post\_filt}(k)$ is a filter gain (namely, the second filter gain), that is finally obtained according to $\text{gain}_{f1}(k)$, of five low-frequency domain coefficients corresponding to the $k^{th}$ sub-spectrum; $\text{gain}_{f1}(k)$ is the adjusted second filter gain; k=0, 1, ..., 13, and k is an index number of a subband, which indicates 14 subbands.

Specifically, after the second filter gain $\text{gain}_{Low\_post\_filt}(k)$ corresponding to the $k^{th}$ sub-spectrum is determined, because a first filter gain includes the second quantity of (for example, L=14) second filter gains $\text{gain}_{Low\_post\_filt}(k)$, and the second filter gains $\text{gain}_{Low\_post\_filt}(k)$ are filter gains of N spectrum coefficients corresponding to the $k^{th}$ sub-spectrum, the first filter gain $G_{Low\_post\_filt}(j)$ can be obtained.

Step T7: Frequency-Time Transform, that is, an Inverse MDCT (IMDCT):

A broadband signal after BWE is obtained based on a low-frequency spectrum and a high-frequency spectrum.

Specifically, the low-frequency domain coefficients $S_{Low\_rev}(i, j)$ and the high-frequency domain coefficients $S_{High\_rev}(i, j)$ are combined, to generate a high-frequency spectrum. An inverse transform of a time-frequency transform (that is, an IMDCT) is performed based on the low-frequency spectrum and the high-frequency spectrum, and a new speech frame $s_{Rec}(i, j)$, that is, a broadband signal, can be generated. In this case, an effective spectrum of the to-be-processed narrowband signal has been extended into 7000 Hz.

By using the method in the related art, in a speech communication scenario of PSTN and VoIP interworking, only narrowband voice (of which a sampling rate is 8 k Hz and an effective bandwidth is generally 3.5 k Hz) from a PSTN can be received on a VoIP side. An intuitive feeling of a user is that sound is not sonorous enough, a volume is not high enough, and intelligibility is mediocre. When BWE is performed based on the technical solutions disclosed in this application, no additional bits are required, and an effective bandwidth can be extended to 7 k Hz on a receiving end of the VoIP side. The user can intuitively feel a more sonorous timbre, a higher volume, and better intelligibility. In addition, based on the solutions, there is no forward compatibility problem, that is, it is unnecessary to modify a protocol, and prefect compatibility with PSTN can be achieved.

The method in the embodiments of this application may be applied to a downstream side of a PSTN-VoIP channel. For example, functional modules of the solutions provided in the embodiments of this application may be integrated on a client in which a conference system is installed, so that BWE on a narrowband signal can be implemented on the client, to obtain a broadband signal. Specifically, signal processing in the scenario is a signal post processing technology. By using the PSTN (an encoding system may be ITU-T G.711) as an example, in the conference system client, a speech frame is restored after G.711 decoding is completed; and the post-processing technology related to implementation of this application is used for the speech frame, which enables a VoIP user to receive a broadband signal even if a signal on a transmit end is a narrowband signal.

The method in the embodiments of this application may alternatively be applied in a mixing server of a PSTN-VoIP channel. After BWE is performed by using the mixing server, a broadband signal after BWE is transmitted to a VoIP client. After receiving a VoIP bitstream corresponding to the broadband signal, the VoIP client can restore, by decoding the VoIP bitstream, broadband voice outputted through BWE. A typical function in the mixing server is performing transcoding, for example, transcoding a bitstream in a PSTN link (for example, through G.711 encoding) into a bitstream (for example, Opus or SILK) that is commonly used in the VoIP. On the mixing server, a speech frame after G.711 decoding may be upsampled to 16000 Hz, and then BWE is completed by using the solutions provided in the embodiments of this application; and then a bitstream commonly used in the VoIP is obtained through transcoding. When receiving one or more VoIP bitstreams, the VoIP client can restore, through decoding, broadband voice outputted through BWE.

Figure 5:
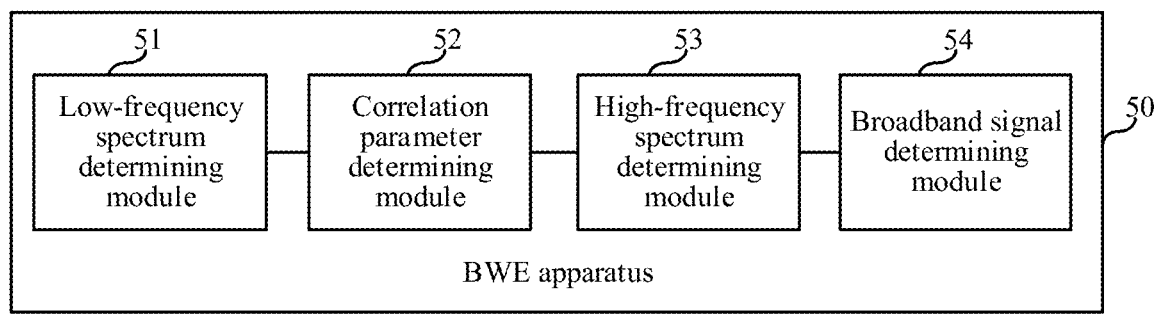
FIG. 5 is a schematic structural diagram of a BWE apparatus according to an embodiment of this application.

FIG. 5 is a schematic structural diagram of a BWE apparatus according to still another embodiment of this application. As shown in FIG. 5, the apparatus 50 may include a low-frequency spectrum determining module 51, a correlation parameter determining module 52, a high-frequency spectrum determining module 53, and a broadband signal determining module 54.

The low-frequency spectrum determining module 51 is configured to perform a time-frequency transform on a to-be-processed narrowband signal to obtain a corresponding initial low-frequency spectrum.

The correlation parameter determining module 52 is configured to obtain a correlation parameter of a high-frequency portion and a low-frequency portion of a target broadband spectrum based on the initial low-frequency spectrum by using a neural network model, the correlation parameter including at least one of a high-frequency spectral envelope and relative flatness information, the relative flatness information representing a correlation between a spectral flatness of the high-frequency portion of the target broadband spectrum and a spectral flatness of the low-frequency portion of the target broadband spectrum.

The high-frequency spectrum determining module 53 is configured to obtain an initial high-frequency spectrum based on the correlation parameter and the initial low-frequency spectrum.

The broadband signal determining module 54 is configured to obtain a broadband signal after BWE according to a target low-frequency spectrum and a target high-frequency spectrum, the target low-frequency spectrum being the initial low-frequency spectrum or a spectrum obtained by filtering the initial low-frequency spectrum, and the target high-frequency spectrum being the initial high-frequency spectrum or a spectrum obtained by filtering the initial high-frequency spectrum.

In one embodiment, when filtering the initial low-frequency spectrum or the initial high-frequency spectrum, the broadband signal determining module is further configured to:

divide an initial spectrum into a first quantity of sub-spectra, and determine first spectrum power corresponding to each sub-spectrum, the initial spectrum including the initial low-frequency spectrum or the initial high-frequency spectrum;

determine a filter gain corresponding to each sub-spectrum based on the first spectrum power corresponding to each sub-spectrum; and respectively filter the corresponding each sub-spectrum according to the filter gain corresponding to each sub-spectrum.

In one embodiment, when determining a filter gain corresponding to each sub-spectrum based on the first spectrum power corresponding to each sub-spectrum, the broadband signal determining module is further configured to:

divide a band corresponding to the initial spectrum into a first subband and a second subband;

determine first subband power of the first subband according to first spectrum power of all sub-spectra corresponding to the first subband, and determine second subband power of the second subband according to first spectrum power of all sub-spectra corresponding to the second subband;

determine a spectral tilt coefficient of the initial spectrum according to the first subband power and the second subband power; and determine the filter gain corresponding to each sub-spectrum according to the spectral tilt coefficient and the first spectrum power corresponding to each sub-spectrum.

In one embodiment, the narrowband signal is a speech signal of a current speech frame, and when determining first spectrum power of one sub-spectrum, the broadband signal determining module is further configured to:

determine first initial spectrum power of the one sub-spectrum;

determine the first initial spectrum power as the first spectrum power when the current speech frame is the first speech frame;

obtain second initial spectrum power of a sub-spectrum of an associated speech frame corresponding to the one sub-spectrum when the current speech frame is not the first speech frame, the associated speech frame being at least one speech frame previous to and adjacent to the current speech frame; and obtain the first spectrum power of the one sub-spectrum based on the first initial spectrum power and the second initial spectrum power.

In one embodiment, the correlation parameter includes the high-frequency spectral envelope and the relative flatness information; and the neural network model includes at least an input layer and an output layer, a feature vector of a low-frequency spectrum is inputted into the input layer, the output layer includes at least a unilateral LSTM layer and two fully connected network layers that are respectively connected to the LSTM layer, and each fully connected network layer includes at least one fully connected layer, the LSTM layer transforming a feature vector processed by the input layer. One fully connected network layer performs first classification according to a vector value transformed by the LSTM layer and outputs the high-frequency spectral envelope, and an other fully connected layer performs second classification according to the vector value transformed by the LSTM layer and outputs the relative flatness information.

In one embodiment, the apparatus further includes a processing module.

The processing module is further configured to determine a low-frequency spectral envelope of the to-be-processed narrowband signal based on the initial low-frequency spectrum.

An input of the neural network model further includes the low-frequency spectral envelope.

In one embodiment, the time-frequency transform includes a Fourier transform or a discrete cosine transform.

When the time-frequency transform is a Fourier transform, when obtaining a correlation parameter of a high-frequency portion and a low-frequency portion of a target broadband spectrum based on the initial low-frequency spectrum by using a neural network model, the high-frequency spectrum determining module is further configured to:

obtain a low-frequency amplitude spectrum of the to-be-processed narrowband signal according to the initial low-frequency spectrum; and input the low-frequency amplitude spectrum into the neural network model, and obtain the correlation parameter based on an output of the neural network model.

When the time-frequency transform is a discrete cosine transform, when obtaining a correlation parameter of a high-frequency portion and a low-frequency portion of a target broadband spectrum based on the initial low-frequency spectrum by using a neural network model, the high-frequency spectrum determining module is further configured to:

input the initial low-frequency spectrum into the neural network model, and obtain the correlation parameter based on an output of the neural network model.

In one embodiment, the time-frequency transform includes a Fourier transform or a discrete cosine transform.

When the time-frequency transform is a Fourier transform, when obtaining an initial high-frequency spectrum based on the correlation parameter and the initial low-frequency spectrum, the high-frequency spectrum determining module is further configured to:

obtain a low-frequency spectral envelope of the to-be-processed narrowband signal according to the initial low-frequency spectrum;

replicate an amplitude spectrum of a high-band portion in a low-frequency amplitude spectrum, to generate an initial high-frequency amplitude spectrum;

adjust the initial high-frequency amplitude spectrum based on the high-frequency spectral envelope and the low-frequency spectral envelope, to obtain a target high-frequency amplitude spectrum;

generate a corresponding high-frequency phase spectrum based on a low-frequency phase spectrum of the narrowband signal; and obtain the initial high-frequency spectrum according to the target high-frequency amplitude spectrum and the high-frequency phase spectrum.

When the time-frequency transform is a discrete cosine transform, when obtaining an initial high-frequency spectrum based on the correlation parameter and the initial low-frequency spectrum, the high-frequency spectrum determining module is further configured to:

obtain a low-frequency spectral envelope of the to-be-processed narrowband signal according to the initial low-frequency spectrum;

replicate a spectrum of a high-frequency band portion in the initial low-frequency spectrum, to generate a first high-frequency spectrum; and adjust the first high-frequency spectrum based on the high-frequency spectral envelope and the low-frequency spectral envelope, to obtain the initial high-frequency spectrum.

In one embodiment, the correlation parameter further includes relative flatness information, the relative flatness information representing a correlation between a spectral flatness of the high-frequency portion of the target broadband spectrum and a spectral flatness of the low-frequency portion of the target broadband spectrum.

When adjusting high-frequency spectrum information based on the high-frequency spectral envelope and the low-frequency spectral envelope, the high-frequency spectrum determining module is further configured to:

determine a gain adjustment value of the high-frequency spectral envelope based on the relative flatness information and energy information of the initial low-frequency spectrum;

adjust the high-frequency spectral envelope based on the gain adjustment value, to obtain an adjusted high-frequency spectral envelope; and adjust the high-frequency spectrum information based on the adjusted high-frequency spectral envelope and the low-frequency spectral envelope, the high-frequency spectrum information including the initial high-frequency amplitude spectrum or the first high-frequency spectrum.

In one embodiment, the relative flatness information includes relative flatness information corresponding to at least two subband regions of the high-frequency portion, relative flatness information corresponding to one subband region representing a correlation between a spectral flatness of the subband region of the high-frequency portion and a spectral flatness of a high-frequency band of the low-frequency portion.

When the high-frequency portion includes spectrum parameters corresponding to the at least two subband regions, a spectrum parameter of each subband region is obtained based on a spectrum parameter of the high-frequency band of the low-frequency portion, and the relative flatness information includes relative flatness information between the spectrum parameter of each subband region and the spectrum parameter of the high-frequency band, when the time-frequency transform is a Fourier transform, the spectrum parameter is the amplitude spectrum, and if the time-frequency transform is a discrete cosine transform, the spectrum parameter is the spectrum.

When determining a gain adjustment value of the high-frequency spectral envelope based on the relative flatness information and energy information of the initial low-frequency spectrum, the high-frequency spectrum determining module is further configured to:

determine a gain adjustment value of a corresponding spectral envelope part in the high-frequency spectral envelope based on relative flatness information corresponding to each subband region and spectrum power information corresponding to each subband region in the initial low-frequency spectrum.

When adjusting the high-frequency spectral envelope based on the gain adjustment value, the high-frequency spectrum determining module is further configured to:

adjust each corresponding spectral envelope part according to a gain adjustment value of the corresponding spectral envelope part in the high-frequency spectral envelope.

In one embodiment, the high-frequency spectral envelope includes a first predetermined quantity of high-frequency sub-spectral envelopes.

When determining a gain adjustment value of a corresponding spectral envelope part in the high-frequency spectral envelope based on relative flatness information corresponding to each subband region and spectrum power information corresponding to each subband region in the initial low-frequency spectrum, the high-frequency spectrum determining module is further configured to:

determine, for each high-frequency sub-spectral envelope, a gain adjustment value of each high-frequency sub-spectral envelope according to spectrum power information corresponding to a spectral envelope in the low-frequency spectral envelope corresponding to each high-frequency sub-spectral envelope, relative flatness information corresponding to a subband region corresponding to the spectral envelope in the low-frequency spectral envelope corresponding to each high-frequency sub-spectral envelope, and spectrum power information corresponding to the subband region corresponding to the spectral envelope in the low-frequency spectral envelope corresponding to each high-frequency sub-spectral envelope.

When adjusting each corresponding spectral envelope part according to a gain adjustment value of the corresponding spectral envelope part in the high-frequency spectral envelope, the high-frequency spectrum determining module is further configured to:

adjust each high-frequency sub-spectral envelope according to a gain adjustment value of the corresponding high-frequency sub-spectral envelope in the high-frequency spectral envelope.

By means of the BWE method and apparatus provided in the embodiments of this application, in a process of obtaining a broadband signal after BWE according to a target low-frequency spectrum and a target high-frequency spectrum, by filtering at least one of an initial low-frequency spectrum or an initial high-frequency spectrum, the initial low-frequency spectrum can be filtered before a broadband signal is obtained, so that quantization noise that may be introduced during quantization of a narrowband signal is effectively filtered out; and the initial high-frequency spectrum may also be filtered, so that noise introduced during BWE based on the initial low-frequency spectrum is effectively filtered out, and signal quality of the broadband signal is improved, thereby further improving the listening experience of users. In addition, when BWE is performed by using the method in this solution, side information does not need to be recorded in advance, that is, no additional bandwidth is required.

This embodiment is an apparatus embodiment corresponding to the foregoing method embodiment, and may be implemented in cooperation with the foregoing method embodiment. Related technical details mentioned in the foregoing method embodiment is still effective in this embodiment. To reduce repetition, details are not described herein again. Correspondingly, related technical details mentioned in this embodiment may also be applied in the foregoing method embodiment.

As shown in FIG. 6, another embodiment of this application provides an electronic device. An electronic device 600 shown in FIG. 6 includes a processor 601 and a memory 603. The processor 601 and the memory 603 are connected, for example, are connected by using a bus 602. Further, the electronic device 600 may further include a transceiver 604. In one embodiment, there may be one or more transceivers 604. The structure of the electronic device 600 does not constitute a limitation on this embodiment.

The processor 601 is applied to this embodiment, and is configured to implement functions of a low-frequency spectrum parameter determining module, a correlation parameter determining module, a high-frequency amplitude spectrum determining module, a high-frequency phase spectrum generation module, a high-frequency spectrum determining module, and a broadband signal determining module shown in FIG. 5.

The processor 601 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in this application. The processor 601 may be alternatively a combination to implement a computing function, for example, may be a combination of one or more microprocessors, or a combination of a DSP and a microprocessor.

The bus 602 may include a channel, to transmit information between the foregoing components. The bus 602 may be a PCI bus, an EISA bus, or the like. The bus 602 may be classified into an address bus, a data bus, a control bus, and the like. For ease of description, the bus in FIG. 6 is represented by using only one bold line, but this does not indicate that there is only one bus or one type of bus.

The memory 603 may be a ROM or another type of static storage device that can store static information and a static instruction; or a RAM or another type of dynamic storage device that can store information and an instruction; or may be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

The memory 603 is configured to store application program codes for performing the solutions of this application, and is controlled and executed by the processor 601. The processor 601 is configured to execute application program codes stored on the memory 603 to implement actions of the BWE apparatus provided in the embodiment shown in FIG. 5.

The electronic device provided in the embodiments of this application includes a memory, a processor, and a computer program stored on the memory and executable on the processor, the processor, when executing the program, can implement that: in a process of obtaining a broadband signal after BWE according to a target low-frequency spectrum and a target high-frequency spectrum, by filtering at least one of an initial low-frequency spectrum or an initial high-frequency spectrum, the initial low-frequency spectrum can be filtered before a broadband signal is obtained, so that quantization noise that may be introduced during quantization of a narrowband signal is effectively filtered out; and the initial high-frequency spectrum may also be filtered, so that noise introduced during BWE based on the initial low-frequency spectrum is effectively filtered out, and signal quality of the broadband signal is improved, thereby further improving the listening experience of users. In addition, when BWE is performed by using the method in this solution, side information does not need to be recorded in advance, that is, no additional bandwidth is required.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

An embodiment of this application further provides a computer program product or a computer program. The computer program product or the computer program includes computer instructions, and the computer instructions are stored in a computer-readable storage medium. A processor of an electronic device reads the computer instructions from the computer-readable storage medium and executes the computer instructions to cause the electronic device to perform the foregoing BWE method.

An embodiment of this application provides a computer-readable storage medium, storing a computer program, the program, when executed by a processor, implementing the method according to the foregoing embodiments. In a process of obtaining a broadband signal after BWE according to a target low-frequency spectrum and a target high-frequency spectrum, by filtering at least one of an initial low-frequency spectrum or an initial high-frequency spectrum, the initial low-frequency spectrum can be filtered before a broadband signal is obtained, so that quantization noise that may be introduced during quantization of a narrowband signal is effectively filtered out; and the initial high-frequency spectrum may also be filtered, so that noise introduced during BWE based on the initial low-frequency spectrum is effectively filtered out, and signal quality of the broadband signal is improved, thereby further improving the listening experience of users. In addition, when BWE is performed by using the method in this solution, side information does not need to be recorded in advance, that is, no additional bandwidth is required.

The computer-readable storage medium provided in this embodiment is applied to any embodiment of the foregoing method.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of another step.

The foregoing descriptions are some implementations of this application. A person of ordinary skill in the art may make several improvements and refinements without departing from the principle of this application, and the improvements and refinements shall fall within the protection scope of this application.

What is claimed is:

1. A bandwidth extension (BWE) method, performed by an electronic device, the method comprising:
 performing a time-frequency transform on a to-be-processed narrowband signal to obtain a corresponding initial low-frequency spectrum;
 obtaining a correlation parameter of a high-frequency portion and a low-frequency portion of a target broadband spectrum based on the initial low-frequency spectrum by using a neural network model, the correlation parameter comprising a high-frequency spectral envelope and relative flatness information, the relative flatness information representing a correlation between a spectral flatness of the high-frequency portion of the target broadband spectrum and a spectral flatness of the low-frequency portion of the target broadband spectrum;

obtaining an initial high-frequency spectrum based on the correlation parameter and the initial low-frequency spectrum; and obtaining a broadband signal according to a target low-frequency spectrum and a target high-frequency spectrum, the target low-frequency spectrum being the initial low-frequency spectrum or a spectrum obtained by filtering the initial low-frequency spectrum, and the target high-frequency spectrum being the initial high-frequency spectrum or a spectrum obtained by filtering the initial high-frequency spectrum, wherein the neural network model comprises at least an input layer and an output layer, a feature vector of a low-frequency spectrum is inputted into the input layer, the output layer comprises at least a unilateral long short-term memory (LSTM) layer and two fully connected network layers that are respectively connected to the LSTM layer, and each fully connected network layer comprises at least one fully connected layer, the LSTM layer transforming a feature vector processed by the input layer, one fully connected network layer performing first classification according to a vector value transformed by the LSTM layer and outputting the high-frequency spectral envelope, and another fully connected network layer performing second classification according to the vector value transformed by the LSTM layer and outputting the relative flatness information.

2. The method according to claim 1, wherein the filtering the initial low-frequency spectrum or the initial high-frequency spectrum comprises:

dividing an initial spectrum into a first quantity of sub-spectra, and determining first spectrum power corresponding to each sub-spectrum, the initial spectrum comprising the initial low-frequency spectrum or the initial high-frequency spectrum;

determining a filter gain corresponding to each sub-spectrum based on the first spectrum power corresponding to each sub-spectrum; and respectively filtering the corresponding each sub-spectrum according to the filter gain corresponding to each sub-spectrum.

3. The method according to claim 2, wherein the determining a filter gain corresponding to each sub-spectrum based on the first spectrum power corresponding to each sub-spectrum comprises:

dividing a band corresponding to the initial spectrum into a first subband and a second subband;

determining first subband power of the first subband according to first spectrum power of all sub-spectra corresponding to the first subband, and determining second subband power of the second subband according to first spectrum power of all sub-spectra corresponding to the second subband;

determining a spectral tilt coefficient of the initial spectrum according to the first subband power and the second subband power; and determining the filter gain corresponding to each sub-spectrum according to the spectral tilt coefficient and the first spectrum power corresponding to each sub-spectrum.

4. The method according to claim 3, wherein the narrowband signal is a speech signal of a current speech frame, and determining first spectrum power of each sub-spectrum comprises:

determining first initial spectrum power of a sub-spectrum;

determining the first initial spectrum power as the first spectrum power when the current speech frame is the first speech frame;

obtaining second initial spectrum power of a sub-spectrum of an associated speech frame corresponding to the sub-spectrum when the current speech frame is not the first speech frame, the associated speech frame being at least one speech frame previous to and adjacent to the current speech frame; and obtaining the first spectrum power of the one sub-spectrum based on the first initial spectrum power and the second initial spectrum power.

5. The method according to claim 1, wherein the method further comprises:

determining a low-frequency spectral envelope of the to-be-processed narrowband signal based on the initial low-frequency spectrum, an input of the neural network model further comprising the low-frequency spectral envelope.

6. The method according to claim 1, wherein when the time-frequency transform is a Fourier transform, the obtaining a correlation parameter of a high-frequency portion and a low-frequency portion of a target broadband spectrum based on the initial low-frequency spectrum by using a neural network model comprises:

obtaining a low-frequency amplitude spectrum of the to-be-processed narrowband signal according to the initial low-frequency spectrum; and inputting the low-frequency amplitude spectrum into the neural network model, and obtaining the correlation parameter based on an output of the neural network model.

7. The method according to claim 1, wherein when the time-frequency transform is a discrete cosine transform, the obtaining a correlation parameter of a high-frequency portion and a low-frequency portion of a target broadband spectrum based on the initial low-frequency spectrum by using a neural network model comprises:

inputting the initial low-frequency spectrum into the neural network model, and obtaining the correlation parameter based on an output of the neural network model.

8. The method according to claim 1, wherein when the time-frequency transform is a Fourier transform, the obtaining an initial high-frequency spectrum based on the correlation parameter and the initial low-frequency spectrum comprises:

obtaining a low-frequency spectral envelope of the to-be-processed narrowband signal according to the initial low-frequency spectrum;

replicating an amplitude spectrum of a high-band portion in a low-frequency amplitude spectrum, to generate high-frequency spectrum information;

adjusting the high-frequency spectrum information based on the high-frequency spectral envelope and the low-frequency spectral envelope, to obtain a target high-frequency amplitude spectrum, the high-frequency spectrum information comprising an initial high-frequency amplitude spectrum;

generating a corresponding high-frequency phase spectrum based on a low-frequency phase spectrum of the narrowband signal; and obtaining the initial high-frequency spectrum according to the target high-frequency amplitude spectrum and the high-frequency phase spectrum.

9. The method according to claim 1, wherein when the time-frequency transform is a discrete cosine transform, the obtaining an initial high-frequency spectrum based on the correlation parameter and the initial low-frequency spectrum comprises:

obtaining a low-frequency spectral envelope of the to-be-processed narrowband signal according to the initial low-frequency spectrum;

replicating a spectrum of a high-frequency band portion in the initial low-frequency spectrum, to generate high-frequency spectrum information; and adjusting the high-frequency spectrum information based on the high-frequency spectral envelope and the low-frequency spectral envelope, to obtain the initial high-frequency spectrum, the high-frequency spectrum information comprising a first high-frequency spectrum.

10. The method according to claim 8, wherein the adjusting the high-frequency spectrum information based on the high-frequency spectral envelope and the low-frequency spectral envelope comprises:

determining a gain adjustment value of the high-frequency spectral envelope based on the relative flatness information and energy information of the initial low-frequency spectrum;

adjusting the high-frequency spectral envelope based on the gain adjustment value, to obtain an adjusted high-frequency spectral envelope; and adjusting the high-frequency spectrum information based on the adjusted high-frequency spectral envelope and the low-frequency spectral envelope.

11. The method according to claim 10, wherein the relative flatness information comprises relative flatness information corresponding to at least two subband regions of the high-frequency portion, relative flatness information corresponding to one subband region representing a correlation between a spectral flatness of the subband region of the high-frequency portion and a spectral flatness of a high-frequency band of the low-frequency portion;

when the high-frequency portion comprises spectrum parameters corresponding to the at least two subband regions, a spectrum parameter of each subband region is obtained based on a spectrum parameter of the high-frequency band of the low-frequency portion, and the relative flatness information comprises relative flatness information between the spectrum parameter of each subband region and the spectrum parameter of the high-frequency band, when the time-frequency transform is a Fourier transform, the spectrum parameter being the amplitude spectrum, and when the time-frequency transform is a discrete cosine transform, the spectrum parameter being the spectrum;

the determining a gain adjustment value of the high-frequency spectral envelope based on the relative flatness information and energy information of the initial low-frequency spectrum comprises:

determining a gain adjustment value of a corresponding spectral envelope part in the high-frequency spectral envelope based on relative flatness information corresponding to each subband region and spectrum power information corresponding to each subband region in the initial low-frequency spectrum; and the adjusting the high-frequency spectral envelope based on the gain adjustment value comprises:

adjusting each corresponding spectral envelope part according to a gain adjustment value of the corresponding spectral envelope part in the high-frequency spectral envelope.

12. The method according to claim 11, wherein the high-frequency spectral envelope comprises a first predetermined quantity of high-frequency sub-spectral envelopes;

the determining a gain adjustment value of a corresponding spectral envelope part in the high-frequency spectral envelope based on relative flatness information corresponding to each subband region and spectrum power information corresponding to each subband region in the initial low-frequency spectrum comprises:

determining, for each high-frequency sub-spectral envelope, a gain adjustment value of each high-frequency sub-spectral envelope according to spectrum power information corresponding to a spectral envelope in the low-frequency spectral envelope corresponding to each high-frequency sub-spectral envelope, relative flatness information corresponding to a subband region corresponding to the spectral envelope in the low-frequency spectral envelope corresponding to each high-frequency sub-spectral envelope, and spectrum power information corresponding to the subband region corresponding to the spectral envelope in the low-frequency spectral envelope corresponding to each high-frequency sub-spectral envelope; and the adjusting each corresponding spectral envelope part according to a gain adjustment value of the corresponding spectral envelope part in the high-frequency spectral envelope comprises:

adjusting each high-frequency sub-spectral envelope according to a gain adjustment value of the corresponding high-frequency sub-spectral envelope in the high-frequency spectral envelope.

13. A bandwidth extension (BWE) apparatus, comprising: at least one memory, at least one processor, and a computer program stored on the at least one memory and executable on the at least one processor, wherein the at least one processor, when executing the program, is configured to:

perform a time-frequency transform on a to-be-processed narrowband signal to obtain a corresponding initial low-frequency spectrum;

obtain a correlation parameter of a high-frequency portion and a low-frequency portion of a target broadband spectrum based on the initial low-frequency spectrum by using a neural network model, the correlation parameter comprising a high-frequency spectral envelope and relative flatness information, the relative flatness information representing a correlation between a spectral flatness of the high-frequency portion of the target broadband spectrum and a spectral flatness of the low-frequency portion of the target broadband spectrum;

obtain an initial high-frequency spectrum based on the correlation parameter and the initial low-frequency spectrum; and obtain a broadband signal according to a target low-frequency spectrum and a target high-frequency spectrum, the target low-frequency spectrum being the initial low-frequency spectrum or a spectrum obtained by filtering the initial low-frequency spectrum, and the target high-frequency spectrum being the initial high-frequency spectrum or a spectrum obtained by filtering the initial high-frequency spectrum, wherein the neural network model comprises at least an input layer and an output layer, a feature vector of a low-frequency spectrum is inputted into the input layer, the output layer comprises at least a unilateral long short-term memory (LSTM) layer and two fully connected network layers that are respectively connected to the LSTM layer, and each fully connected network layer comprises at least one fully connected layer, the LSTM layer transforming a feature vector processed by the input layer, one fully connected network layer performing first classification according to a vector value transformed by the LSTM layer and outputting the high-frequency spectral envelope, and another fully connected network layer performing second classification according to the vector value transformed by the LSTM layer and outputting the relative flatness information.

14. The apparatus according to claim 13, wherein the at least one processor is further configured to:

divide an initial spectrum into a first quantity of sub-spectra, and determine first spectrum power corresponding to each sub-spectrum, the initial spectrum comprising the initial low-frequency spectrum or the initial high-frequency spectrum;

determine a filter gain corresponding to each sub-spectrum based on the first spectrum power corresponding to each sub-spectrum; and respectively filter the corresponding each sub-spectrum according to the filter gain corresponding to each sub-spectrum.

15. The apparatus according to claim 14, wherein the at least one processor is further configured to:

divide a band corresponding to the initial spectrum into a first subband and a second subband;

determine first subband power of the first subband according to first spectrum power of all sub-spectra corresponding to the first subband, and determine second subband power of the second subband according to first spectrum power of all sub-spectra corresponding to the second subband;

determine a spectral tilt coefficient of the initial spectrum according to the first subband power and the second subband power; and determine the filter gain corresponding to each sub-spectrum according to the spectral tilt coefficient and the first spectrum power corresponding to each sub-spectrum.

16. The apparatus according to claim 15, wherein the at least one processor is further configured to:

determine first initial spectrum power of the one sub-spectrum;

determine the first initial spectrum power as first spectrum power when the current speech frame is the first speech frame;

obtain second initial spectrum power of a sub-spectrum of an associated speech frame corresponding to the one sub-spectrum when the current speech frame is not the first speech frame, the associated speech frame being at least one speech frame previous to and adjacent to the current speech frame; and obtain first spectrum power of the one sub-spectrum based on the first initial spectrum power and the second initial spectrum power.

17. A non-transitory computer-readable storage medium, storing a computer program, the program, when executed by at least one processor, causing the at least one processor to perform:

performing a time-frequency transform on a to-be-processed narrowband signal to obtain a corresponding initial low-frequency spectrum;

obtaining a correlation parameter of a high-frequency portion and a low-frequency portion of a target broadband spectrum based on the initial low-frequency spectrum by using a neural network model, the correlation parameter comprising a high-frequency spectral envelope and relative flatness information, the relative flatness information representing a correlation between a spectral flatness of the high-frequency portion of the target broadband spectrum and a spectral flatness of the low-frequency portion of the target broadband spectrum;

obtaining an initial high-frequency spectrum based on the correlation parameter and the initial low-frequency spectrum; and obtaining a broadband signal according to a target low-frequency spectrum and a target high-frequency spectrum, the target low-frequency spectrum being the initial low-frequency spectrum, or a spectrum obtained by filtering the initial low-frequency spectrum, and the target high-frequency spectrum being the initial high-frequency spectrum or a spectrum obtained by filtering the initial high-frequency spectrum, wherein the neural network model comprises at least an input layer and an output layer, a feature vector of a low-frequency spectrum is inputted into the input layer, the output layer comprises at least a unilateral long short-term memory (LSTM) layer and two fully connected network layers that are respectively connected to the LSTM layer, and each fully connected network layer comprises at least one fully connected layer, the LSTM layer transforming a feature vector processed by the input layer, one fully connected network layer performing first classification according to a vector value transformed by the LSTM layer and outputting the high-frequency spectral envelope, and another fully connected network layer performing second classification according to the vector value transformed by the LSTM layer and outputting the relative flatness information.

18. The computer-readable storage medium according to claim 17, wherein the filtering the initial low-frequency spectrum or the initial high-frequency spectrum comprises:

dividing an initial spectrum into a first quantity of sub-spectra, and determining first spectrum power corresponding to each sub-spectrum, the initial spectrum comprising the initial low-frequency spectrum or the initial high-frequency spectrum;

determining a filter gain corresponding to each sub-spectrum based on the first spectrum power corresponding to each sub-spectrum; and respectively filtering the corresponding each sub-spectrum according to the filter gain corresponding to each sub-spectrum.

* * * * *